(12) United States Patent
Choi et al.

(10) Patent No.: US 8,364,208 B2
(45) Date of Patent: Jan. 29, 2013

(54) PORTABLE TERMINAL HAVING TOUCH SENSITIVE USER INTERFACES

(75) Inventors: Seong-Woo Choi, Gyeonggi-Do (KR); Hyun-Bo Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 772 days.

(21) Appl. No.: 12/497,302

(22) Filed: Jul. 2, 2009

(65) Prior Publication Data
US 2010/0056222 A1 Mar. 4, 2010

(30) Foreign Application Priority Data

Sep. 2, 2008 (KR) ........................ 10-2008-0086491

(51) Int. Cl.
*H04M 1/02* (2006.01)
(52) U.S. Cl. ....................... 455/566; 345/173; 178/18.01
(58) Field of Classification Search ................... 455/566
See application file for complete search history.

(56) References Cited

U.S. PATENT DOCUMENTS

| 6,424,338 | B1 * | 7/2002 | Anderson | 345/173 |
| 7,057,607 | B2 * | 6/2006 | Mayoraz et al. | 345/173 |
| 7,225,410 | B2 * | 5/2007 | Kimmo et al. | 715/748 |
| 7,450,110 | B2 * | 11/2008 | Shahoian et al. | 345/173 |
| 7,603,143 | B2 * | 10/2009 | Kang et al. | 455/566 |
| 7,705,833 | B2 * | 4/2010 | Kim | 345/173 |
| 7,857,224 | B2 * | 12/2010 | Lei | 235/462.42 |
| 7,886,979 | B2 * | 2/2011 | Lei | 235/462.42 |
| 7,956,848 | B2 * | 6/2011 | Chaudhri | 345/173 |
| 8,116,824 | B2 * | 2/2012 | Choi | 455/566 |
| 2004/0209641 | A1 | 10/2004 | Hong | |
| 2006/0035678 | A1 | 2/2006 | Jaakkola | |
| 2006/0139328 | A1 * | 6/2006 | Maki et al. | 345/161 |
| 2007/0026371 | A1 * | 2/2007 | Wood | 434/317 |
| 2007/0035616 | A1 * | 2/2007 | Lee et al. | 348/14.16 |
| 2007/0075915 | A1 * | 4/2007 | Cheon et al. | 345/1.1 |
| 2007/0242421 | A1 * | 10/2007 | Goschin et al. | 361/681 |
| 2007/0296694 | A1 * | 12/2007 | Kim et al. | 345/156 |
| 2008/0105745 | A1 * | 5/2008 | Lei | 235/462.1 |
| 2008/0105746 | A1 * | 5/2008 | Lei | 235/462.11 |
| 2008/0105749 | A1 * | 5/2008 | Lei | 235/462.42 |
| 2008/0119237 | A1 * | 5/2008 | Kim | 455/566 |

(Continued)

FOREIGN PATENT DOCUMENTS

| EP | 1569420 | 8/2005 |
| EP | 1770968 | 4/2007 |

(Continued)

*Primary Examiner* — Hai Nguyen
(74) *Attorney, Agent, or Firm* — Lee, Hong, Degerman, Kang & Waimey

(57) ABSTRACT

A portable terminal includes a body comprising a first display configured to display first data, and first and second covers coupled to a front side of the body, wherein each of the first and second covers is structured to be physically displaceable relative to the body and each being positionable between open and closed positions, wherein the open position of each of the first and second covers permits a relative increase in viewable portion of the front side of the body, and the closed position of each of the first and second covers permits a relative decrease in viewable portion of the front side of the body. The terminal also includes a touch input unit operatively coupled to one of the first display, the first cover, or the second cover, wherein the touch input unit is configured to receive input via user contact.

26 Claims, 16 Drawing Sheets

U.S. PATENT DOCUMENTS

| | | | |
|---|---|---|---|
| 2008/0167081 A1* | 7/2008 | Eng | 455/566 |
| 2008/0309637 A1* | 12/2008 | Lim et al. | 345/173 |
| 2009/0015703 A1* | 1/2009 | Kim et al. | 348/333.12 |
| 2009/0049392 A1* | 2/2009 | Karttunen et al. | 715/762 |
| 2009/0051666 A1* | 2/2009 | Choi et al. | 345/173 |
| 2009/0058822 A1* | 3/2009 | Chaudhri | 345/173 |
| 2009/0131117 A1* | 5/2009 | Choi | 455/566 |
| 2009/0165957 A1* | 7/2009 | Lee | 156/379 |
| 2009/0247112 A1* | 10/2009 | Lundy et al. | 455/404.1 |
| 2009/0295648 A1* | 12/2009 | Dorsey et al. | 343/702 |
| 2010/0033442 A1* | 2/2010 | Kusuda et al. | 345/173 |
| 2010/0159984 A1* | 6/2010 | Nguyen et al. | 455/556.1 |
| 2011/0227857 A1* | 9/2011 | Chaudhri | 345/173 |

FOREIGN PATENT DOCUMENTS

WO 2008/009782 1/2008

* cited by examiner

PORTABLE TERMINAL HAVING TOUCH SENSITIVE USER INTERFACES

CROSS-REFERENCE TO RELATED APPLICATIONS

Pursuant to 35 U.S.C. §119(a), this application claims the benefit of earlier filing date and right of priority to Korean Application No. 10-2008-0086491, filed on Sep. 2, 2008, the contents of which are hereby incorporated by reference herein in their entirety

FIELD OF THE INVENTION

The present invention generally relates to wireless communications, and in particular, to a portable terminal having multiple displays.

DISCUSSION OF THE RELATED ART

In general, portable terminals may be classified into a mobile or portable terminal and a stationary terminal according to its portability. In some cases the mobile or portable terminal may be implemented as a handheld or vehicle mounted terminal. Functions utilized by such terminals are quite diverse and it is common for a terminal to be implemented as an integrated multimedia player having various functions such as image capturing or video via a camera, playing music files or video files, playing games, receiving broadcasts, and the like.

Efforts are ongoing to support and increase the functionality of portable terminals. Such efforts include software improvements, as well as changes and improvements in the structural components which form the portable terminal.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a portable terminal includes a body comprising a first display configured to display first data, and first and second covers coupled to a front side of the body, wherein each of the first and second covers is structured to be physically displaceable relative to the body and each being positionable between open and closed positions, wherein the open position of each of the first and second covers permits a relative increase in viewable portion of the front side of the body, and the closed position of each of the first and second covers permits a relative decrease in viewable portion of the front side of the body. The terminal also includes a touch input unit operatively coupled to one of the first display, the first cover, or the second cover, wherein the touch input unit is configured to receive input via user contact.

In accordance with another embodiment a portable terminal includes a body comprising a first display coupled to the body, the first display being visible from a front side of the body and additionally being configured to display first data, and first and second covers coupled to a rear side of the body, wherein each of the first and second covers is structured to be physically displaceable relative to the body and each being positionable between open and closed positions, wherein the open position of each of the first and second covers permits a relative increase in viewable portion of the rear side of the body, and the closed position of each of the first and second covers permits a relative decrease in viewable portion of the rear side of the body. The terminal further includes a touch input unit operatively coupled to one of the first display, the first cover, or the second cover, wherein the touch input unit is configured to receive input via user contact, a second display coupled to the first cover and being visible from a front side of the first cover, and a third display coupled to the second cover and being visible a front side of the second cover, and wherein the open position of each of the first and second covers and associated second and third displays permits a relative increase in viewable portion of the second and third displays, and the closed position of each of the first and second covers permits a relative decrease in viewable portion of the second and third displays.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

For reference, terms such as "module" and "portion" of components used in the following description are utilized for clarity and are not meant to have different meanings or functions from each other. Various embodiments of a portable terminal will be described herein. Examples of such terminals include a mobile phone, a smart phone, a notebook computer, a digital multimedia broadcasting terminal, a Personal Digital Assistant (PDA), a Portable Multimedia Player (PMP), a navigation device, and the like.

Figure 1:
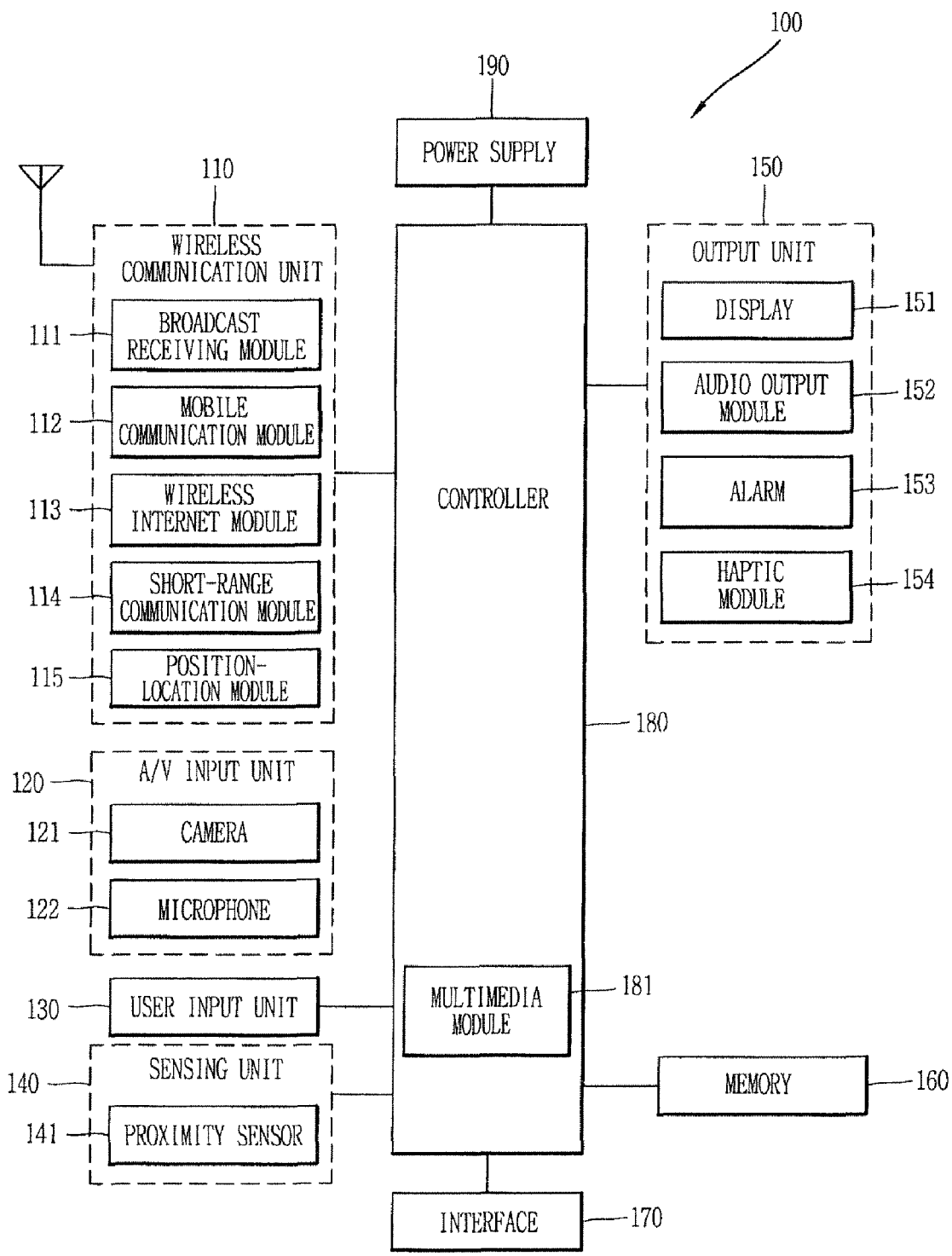
FIG. 1 is a block diagram of a portable terminal according to one exemplary embodiment of the present invention.

FIG. 1 is a block diagram of a portable terminal according to one exemplary embodiment of the present invention. Portable terminal 100 may include a wireless communication unit 110, an A/V (Audio/Video) input unit 120, a user input unit 130, a sensing unit 140, an output unit 150, a memory 160, an interface 170, a controller 180, a power supply 190. It is understood that greater or fewer components than that which is shown in FIG. 1, as well as the other figures, may alternatively be implemented.

Figure 3:
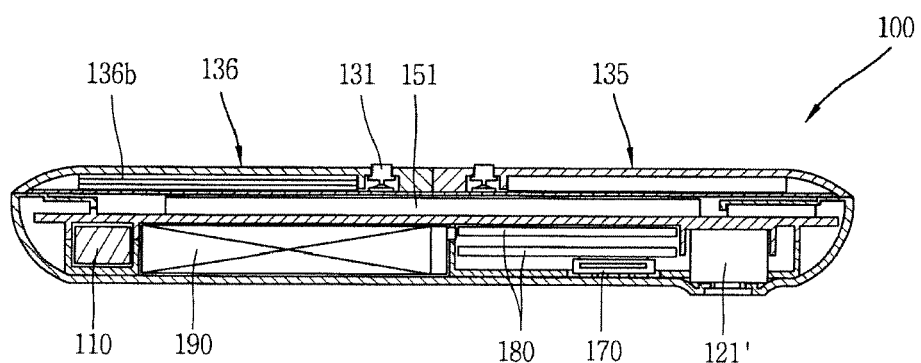
FIG. 3 is a schematic cross-sectional view of FIG. 2.

Wireless communication unit 110 typically includes one or more modules allowing radio (wireless) communication between portable terminal 100 and a wireless communication system or network within which the portable terminal is located. The wireless communication unit may include a broadcast receiver module 111, a mobile communication module 112, a wireless internet module 113, a short-range communication module 114, a position-location module 115, and the like. Wireless communication unit 110 may be located partially or completely within a main body, an example of which is shown in FIG. 3.

Broadcast receiver module 111 may be configured to receive a broadcast signal and/or broadcast associated information from an external broadcast managing server via a broadcast channel. The broadcast channel may include a satellite channel and/or a terrestrial channel. The broadcast managing server may be implemented using a server that generates and transmits a broadcast signal and/or broadcast associated information. Alternatively or additionally, this server may be configured to receive a previously generated broadcast signal and/or broadcast associated information and transmits such signals and information to the terminal. The broadcast signal may be implemented as a TV broadcast signal, a radio broadcast signal, and a data broadcast signal, among others. If desired, the broadcast signal may further include a broadcast signal combined with a TV or radio broadcast signal.

Examples of broadcast associated information include information relating to a broadcast channel, a broadcast program, a broadcast service provider, and the like. The broadcast associated information may also be provided via a mobile communication network and subsequently received by mobile communication module 112.

Different formats may be used for the broadcast associated information. Examples of such formats include an electronic program guide (EPG) of digital multimedia broadcasting (DMB), an electronic service guide (ESG) of digital video broadcast-handheld (DVB-H), and the like.

Broadcast receiver module 111 may be configured to receive broadcast signals using various types of broadcast systems. Examples of such systems include a digital broadcast system, such as Digital Multimedia Broadcasting-Terrestrial (DMB-T), Digital Multimedia Broadcasting-Satellite (DMB-S), a media forward link only (MediaFLO®) system, and the like. The broadcast receiver module 111 may also be configured to be suitable for most any broadcast system that provides a broadcast signal, in addition to those described herein. Broadcast signal receiver antenna 116 (shown in FIG. 2) may be implemented to cooperate with broadcast receiver module 111, and may be installed to be retractable from the main body. A broadcast signal and/or broadcast-associated information received via the broadcast receiver module 111 may be stored in memory 160.

Mobile communication module 112 transmits/receives radio signals to/from one or more entities such as a base station, an external terminal, and a server in a mobile communication network. Such radio signals may include a voice call signal, a video call signal, or various types of data such as that which is utilized in text/multimedia message transmission/reception.

Wireless Internet module 113 supports Internet access for portable terminal 100 a and may be internally or externally coupled to the portable terminal. Examples of suitable Internet technologies include a Wireless LAN (WLAN) (Wi-Fi), Wireless broadband (Wibro), a World Interoperability for Microwave Access (Wimax), and the like.

Short-range communication module 114 is often implemented to support short range communications. Examples of short-range communication technologies include BLUETOOTH, Radio Frequency Identification (RFID), Infrared Data Association (IrDA), Ultra-WideBand (UWB), ZIGBEE, and the like.

Position-location module 115 identifies or otherwise obtains the location of the portable terminal. If desired, this module may be implemented using Global Positioning System (GPS) components.

Referring still to FIG. 1, A/V input unit 120 may be configured for audio or video input. For example, the A/V input unit may include camera 121 and microphone 122. The camera processes image frames of still pictures or videos obtained by an image capture device in an image capturing or video call mode. Processed image frames may be displayed on main display 151.

Image frames processed by camera 121 may be stored in memory 160 and/or transmitted via wireless communication unit 110. Two or more cameras 121 may be alternatively be implemented.

Microphone 122 may receive an external analog audio signal (audible sound) in a phone call mode, a recording mode, a voice recognition mode, or the like. The audio signal may be processed into digital data in known fashion. The processed audio (voice) data may be converted for output into a format transmittable to a mobile communication base station, for example, via mobile communication module 112. This technique is often implemented in the phone call mode. Microphone 122 may include or function in association with various types of noise canceling (or suppression) algorithms to cancel (or suppress) noise generated in the course of receiving and transmitting audio signals.

User input unit 130 may generate key input data responsive to user input. Such input may be used to control various operations of the portable terminal. Example of user input unit 130 include a keypad, a dome switch, a touch pad (e.g., a touch sensitive member that detects changes in resistance, pressure, capacitance, and the like), a jog wheel, and a jog switch, among others.

Sensing unit 140 detects a current status, state, or mode of portable terminal 100, such as an opened/closed state of the portable terminal, a location of the portable terminal, a presence or absence of user contact with the portable terminal, orientation or acceleration/deceleration of the portable terminal, and the like. Responsive to the status, the sensing unit generates commands or signals which may be used for controlling, for example, operation of portable terminal 100. For instance, when the portable terminal is implemented as a slide type mobile phone, sensing unit 140 may sense whether the slide phone is open or closed. Other examples include sensing unit 140 sensing the presence or absence of power provided by power supply 190, the presence or absence of a coupling or other connection between interface 170 and an external device, and the like. Output unit 150 may be configured to provide outputs in a visual, audible, and/or tactile manner (e.g., audio signal, video signal, alarm signal, and the like). The output unit is shown having main display 151, audio output module 152, alarm 153, haptic module 154, and the like.

Main display 151 may output visual information processed in portable terminal 100. For example, when the portable terminal is in the phone call mode, main display 151 may display a User Interface (UI) or a Graphic User Interface (GUI) associated with a call or other communication. When portable terminal 100 is in a video call mode or image capturing mode, main display 151 may display a captured and/or received image, a UI, a GUI, and the like. Display 151 may be implemented using one or more of a Liquid Crystal Display (LCD) panel, a Thin Film Transistor-LCD (TFT-LCD) panel, an Organic Light Emitting Diode (OLED) display, a flexible display screen, a three-dimensional (3D) display screen, and the like.

In some embodiments, the main display may be configured using a transparent or optical transmissive materials to permit viewing through the display. These embodiments will be referred to herein as a transparent display and may be implemented using a Transparent OLED (TOLED), for example. A rear structure of main display 151 may also be configured as the optical transmissive type. This structure allows the user to view an object positioned at a rear of the terminal body through an area where the main display 151 of the terminal body is located.

According to an implementation, two or more displays 151 may be utilized. For instance, a plurality of displays may be spaced from each other, positioned adjacent to each other, or positioned on different surfaces.

Main display 151 and a touch sensor that is configured to sense touch contact may be positioned relative to each other (e.g., layered structures) to form a touch screen. In such an arrangement, the main display may also serve as an input device and an output device. The touch sensor may be implemented as a touch film, a touch sheet, a touch pad, and the like. The touch sensor may be configured to convert changes of a pressure applied to a specific portion of main display 151, or changes of a capacitance occurring from a specific portion of the main display, into electric signals. The touch sensor may be configured to sense not only location of an area that is touched, but touch pressure as well.

Once touch inputs are sensed by the touch sensor, a corresponding signal or signals are transmitted to a touch controller. The touch controller processes the signal, and then transmits corresponding data to controller 180 to permit recognition of the touch position and/or pressure on main display 151.

FIG. 1 further shows proximity sensor 141 arranged at an inner region of the portable terminal covered by the touch screen, or near the touch screen. The proximity sensor is typically implemented as a sensor configured to sense presence or absence of an object approaching a surface to be sensed, or an object located near a surface to be sensed, using an electric field or infrared rays without a mechanical contact. In general, the proximity sensor has a longer lifespan and a more enhanced utilization degree than a contact sensor.

The proximity sensor may include one or more of a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, and an infrared rays proximity sensor, among others. When the touch screen is implemented as a capacitance type proximity sensor, proximity of a pointer to the touch screen is sensed by changes of an electric field. In this case, the touch screen and associated touch sensor may be categorized as a proximity sensor.

By way of example only, the status of a pointer positioned proximate to the touch screen without contact will be referred to as 'proximity touch', the status of the pointer substantially or completely in contact with the touch screen will be referred to as 'contact touch'. The proximity sensor senses proximity touch, and proximity touch patterns (e.g., proximity touch distance, direction, speed, time, position, moving status, and the like). Information relating to the sensed proximity touch, and the sensed proximity touch patterns may be output onto the touch screen.

Audio output module 152 is typically configured to output audio data received from wireless communication unit 110 or stored in memory 160 in a call signal reception mode, a call mode, a recording mode, a voice recognition mode, a broadcast reception mode, and the like. Audio output module 152 may also provide audible outputs related to a particular function (e.g., a call signal reception sound, a message reception sound, or the like) performed by portable terminal 100. The audio output module may include a receiver, a speaker, a buzzer, and the like.

Alarm 153 may provide output relating to an occurrence of an event of the portable terminal 100. Typical events include a call signal reception, a message reception, a key signal input, and the like. In addition to audio or video outputs, alarm 153 may provide output in a different manner to inform about the occurrence of an event. For example, the alarm may provide output in the form of vibrations (or other tactile means). Output relating to the occurrence of an event may be also provided via main display 151 or audio output module 152, and thus, the main display and audio output module 152 may be categorized as an alarm as well.

Haptic module 154 generates various tactile effects. A representative example of the tactile effects generated by the haptic module 154 includes vibration. Vibration generated by the haptic module 154 may have a controllable strength, a controllable pattern, and the like. For instance, different vibration may be output in a synthesized manner or in a sequential manner.

Haptic module 154 may also generate various tactile effects including not only vibration, but also an arrangement of pins vertically or otherwise moving with respect to a surface contacting the haptic module, air injection force or air suction force through an injection hole or a suction hole, touch by a skin surface, presence or absence of contact with an electrode, effects by stimulus such as an electrostatic force, and reproduction relative cooling or heating using a heat absorbing device or a heat emitting device.

Haptic module 154 may be configured to transmit tactile effects through a user's direct contact, or a user's muscular sense using a finger or a hand. If desired, two or more haptic modules 154 may be implemented.

Memory 160 may store software programs or the like used for the processing and controlling operations performed by controller 180, and/or temporarily store inputted/outputted data (e.g., a phonebook, messages, still images, video, and the like). Memory 160 may also store data relating to vibration and sound of various patterns outputted when touch input is applied to the touch screen.

Memory 160 may be implemented using one or more storage mediums including a flash memory, a hard disk, a card-type memory (e.g., SD or XD memory, or the like), a Random Access Memory (RAM), a Static Random Access Memory (SRAM), a Read-Only Memory (ROM), a magnetic memory, a magnetic disk, an optical disk, and the like. Portable terminal 100 may also cooperate with a network storage device (e.g., via the Internet) that remotely performs the storage function of memory 160.

Interface 170 may be used as a link (passage or path) through which portable terminal 100 can exchange data or other signaling with an external device. The interface may be used to receive input (e.g., data, information, power, or the like) from an external device and transfer the received inputs to one or more elements within the portable terminal 100, or may be used to transfer data from the portable terminal 100 to an external device. For example, interface 170 may be implemented using one or more of wired/wireless headset ports, external power charger port, wired/wireless data ports, card sockets, memory card port, a ports for connecting a device having an identification module, audio input/output (I/O) ports, video I/O ports, and an earphone port, among others.

The identification module may be implemented as a chip to store various types of information to identify an authorization right for portable terminal 100, and may include a User Identity Module (UIM), a Subscriber Identity Module (SIM), and the like. A device having the identification module may be implemented as a smart card.

When portable terminal 100 is connected to an external cradle, interface 170 may serve as a passage through which power from the external cradle is supplied to the portable terminal 100, or a passage through which command signal input from the external cradle by a user is transmitted to portable terminal 100. Each kind of command signals input from the external cradle, or the power may operate as signals for recognizing that portable terminal 100 has been sufficiently mounted to the external cradle.

Controller 180 typically controls the general operation of portable terminal 100. For example, the controller may be used to control functions associated with voice calls, data communications, video calls, and the like. In addition, the controller may include a multimedia module 181 for reproducing multimedia data. The multimedia module may be implemented integrally within the controller 180 or by software executed therein, or may be configured separately from the controller. Controller 180 may perform a pattern recognition process to recognize handwriting inputs or picture inputs on the touch screen, as texts or images, respectively.

Power supply 190 is typically configured to receive external or internal power, and supplies power required for the operations of the various elements under the control of controller 180.

Various operations described herein may be implemented in a computer-readable medium using, for example, computer software, hardware, or any combination thereof. For a hardware implementation, these operations may be implemented by using one or more of application specific integrated circuits (ASICs), digital signal processors (DSPs), digital signal processing devices (DSPDs), and electronic units designed to perform the functions described herein. In some cases, such operations may be implemented by controller 180. For a software implementation, these operations nay be implemented together with separate software modules that allow performing of one or more operations. Software code can be implemented by a software application written in any suitable programming language. Software code may be stored in memory 160 and executed by controller 180.

Figure 2:
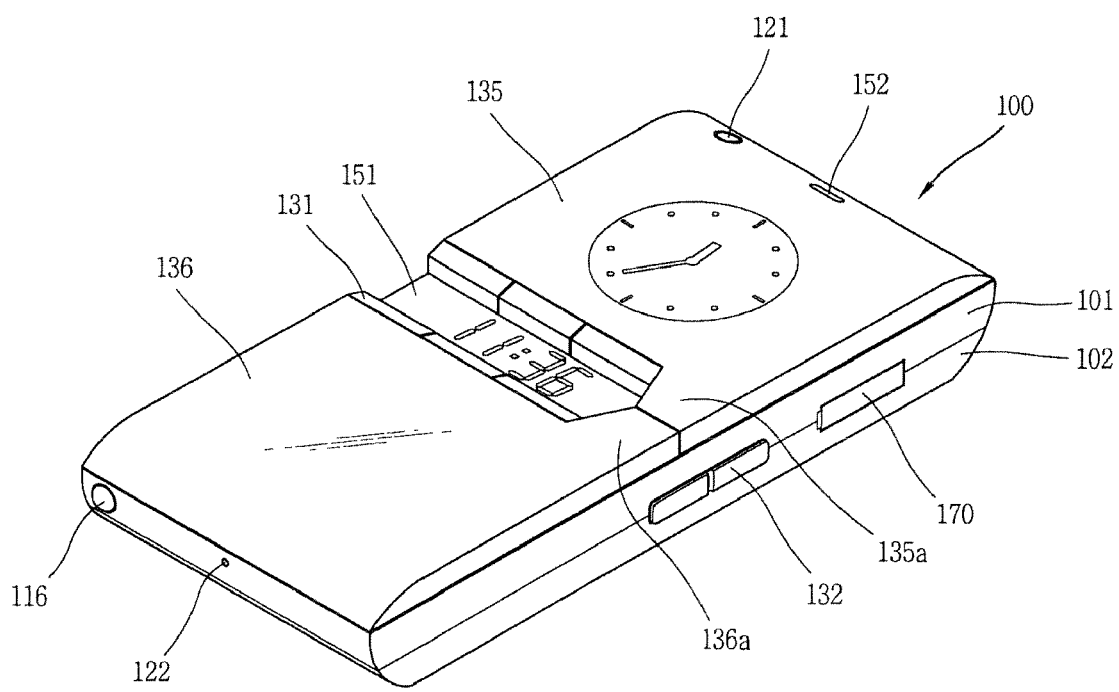
FIG. 2 is a front perspective view showing a portable terminal according to an embodiment of the present invention.

FIG. 2 is a front perspective view showing a portable terminal according to an embodiment of the present invention. FIG. 3 is a schematic cross-sectional view of FIG. 2, and FIG. 4 is a perspective view showing a state that first and second covers 135, 136 in FIG. 2 are moved to a different positions.

Figure 4:
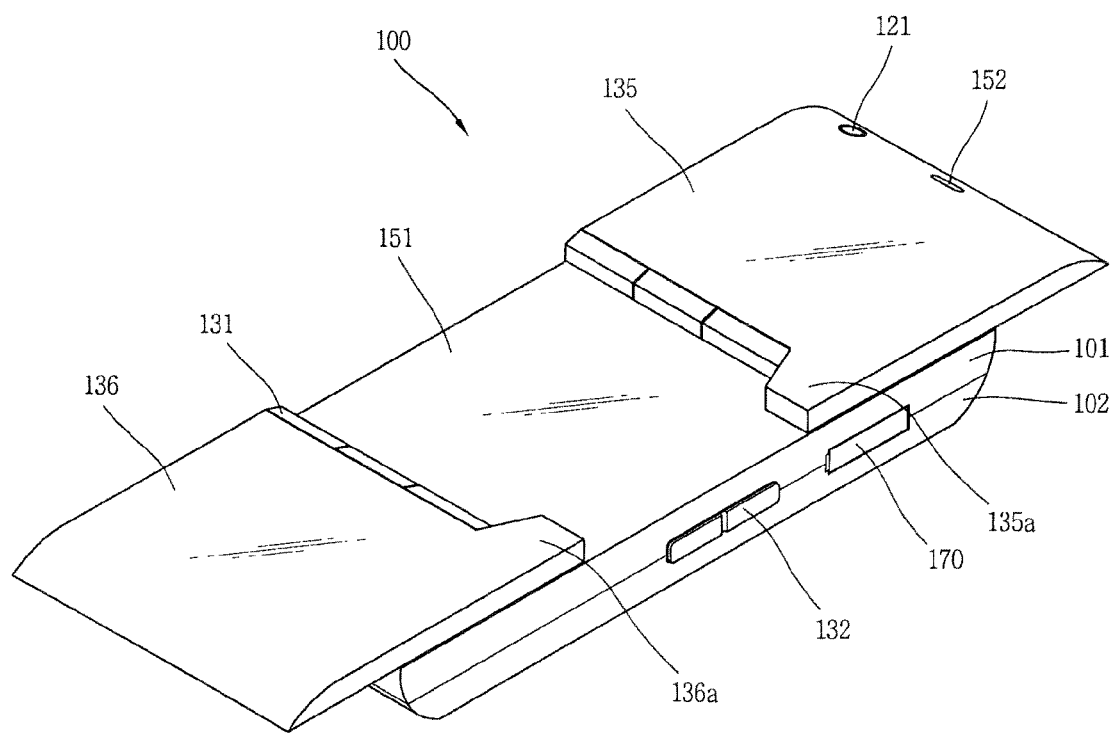
FIG. 4 is a perspective view showing first and second covers moved to different positions.

Referring to FIGS. 2 to 4, terminal 100 is shown configured such that first and second covers 135, 136 are capable of receiving touch input and are slidably coupled and form a bar-type main body or terminal body. However, the present disclosure is not so limited and other configurations are possible including, for example, configuring first and second covers 135, 136 to be rotatably mounted or mounted in a swivel fashion at the terminal body. A plurality of bodies may be coupled to each other and may be configured to permit relative motion between and among such bodies.

The body typically includes a housing (e.g., case, casing, cover, or the like) having an external appearance of the body. In this exemplary embodiment, the housing may be formed by a first (or front) case 101 and a second (or rear) case 102. Various electronic components used to permit operation of the terminal are typically installed in the space defined by the front and rear cases 101, 102. If desired, one or more intermediate cases may be additionally located between the front and rear cases. The cases may be formed using techniques such as injection-molding a synthetic resin, metallic material such as stainless steel (STS) or titanium (Ti), and the like.

Main display 151, audio output module 152, camera 121, user input units 130, 132, microphone 122, interface 170, along with other components, may be located on the terminal body, and in particular, front case 101. The main display is shown occupying the majority of front case 101. Audio output module 152 and camera 121 are located relative to one end of main display 151 on cover 135, and microphone 122 is located relative to another end of the main display. The user input unit 132 and interface 170 are shown positioned on a side of front and rear cases 101, 102.

First and second covers 135, 136 are shown slidably mounted at the main body and are structured to overlap, cover, or otherwise conceal some or all of main display 151. In some embodiments, either or both of the first and second covers may be implemented using a user interface. In general, the first and second covers may be coupled to a front side of the body, such that either or both of the first and second covers is structured to be physically displaceable relative to the main body and being positionable between open and closed positions. The open position generally permits a relative increase in viewable portion of the front side of the body or display, and the closed position generally permits a relative decrease in viewable portion of the front side of the body or display.

In a closed state or position, when first and second covers 135, 136 are formed to be fully or partially transparent, visual information outputted from main display 151 may be externally visible through these covers 135, 136. In some embodiments, the visual information may be the same or different when the covers are in the closed state, as compared to when the covers are in the open state.

First and second covers 135, 136 may be configured to slide along a lengthwise direction of the main body. For example, as the first and second covers 135, 136 slide, the covers may be positioned adjacent to each other (FIG. 2) in a closed state, or spaced apart from each other (FIG. 4) in an open state. Note that the terms closed and open states or positions also include cases in which the subject covers are partially or fully closed or open, respectively.

In a typical open position, main display 151 has a relatively maximum visible area. In a typical closed position, the main display has a relatively minimal or nonexistent visible area. The depicted embodiment includes protruding portions 135a, 136a which extend from an area of a facing edge of the first and second covers and which substantially or completely contact each other in the closed position. In this closed position, a portion of main display 151 is externally visible by virtue of the exposed region that is defined by the protruding portions and the covers. The size and/or design of this exposed region may be changed by modifying some or all of the protruding portions and covers. In some embodiments, the covers are sized so that main display 151 is substantially or completely covered.

When the first and second covers are in the closed position, terminal 100 may operate in a standby or idle mode. In such a standby mode, various types of information such as a current time, day of the week, a battery life, and the like may be displayed on the exposed area of main display 151.

One or more keys 131, serving as a portion of user input unit 130, may be located at an edge of either or both of the first and second covers 135, 136. If desired, keys 131 may be configured to operate responsive to a touch input (e.g., employing a dome switch) in order to complement first and second covers 135, 136, which in some embodiments are also configured to receive touch input. In general, the keys may be used to input commands (e.g., end, confirm, or the like). Embodiments in which either or both of the first and second covers 135, 136 are equipped with a plurality of touch input modes (e.g., Korean/English/Numbers may separately be inputted), keys 131 may receive input of commands for switching a touch input mode to another mode. One surface of the keys 131 is shown located to intersect or otherwise cooperate with surfaces of main display 151 and the first and second covers 135, 136, in order to smoothly connect these components.

In some embodiment, first and/or second covers 135, 136 are configured to function to receive touch input. In such embodiments the covers may be implemented using a touch pad for receiving touch input. For example, in FIG. 3 touch pad 136b is shown implemented to cooperate with the second covers.

Alternatively, first and second covers 135, 136 may implement a touch screen to enable the outputting of visual information as well as the inputting of information by touch. The visual information outputted from the first and second covers may be associated with or independent from visual information outputted from main display 151. If desired, the first and second covers may be configured to permit input to control the visual information outputted to main display 151, and other functions of the terminal as well. For instance, if the first and second covers are implemented using a touch screen, the input commands from the covers may be used to control the visual information output by the touchscreen of the first and second covers.

FIG. 3 shows a circuit board electrically connected to main display 151 and interface 170 to permit control of such components. In some embodiments, controller 180 is implemented using such a circuit board.

Figure 5:
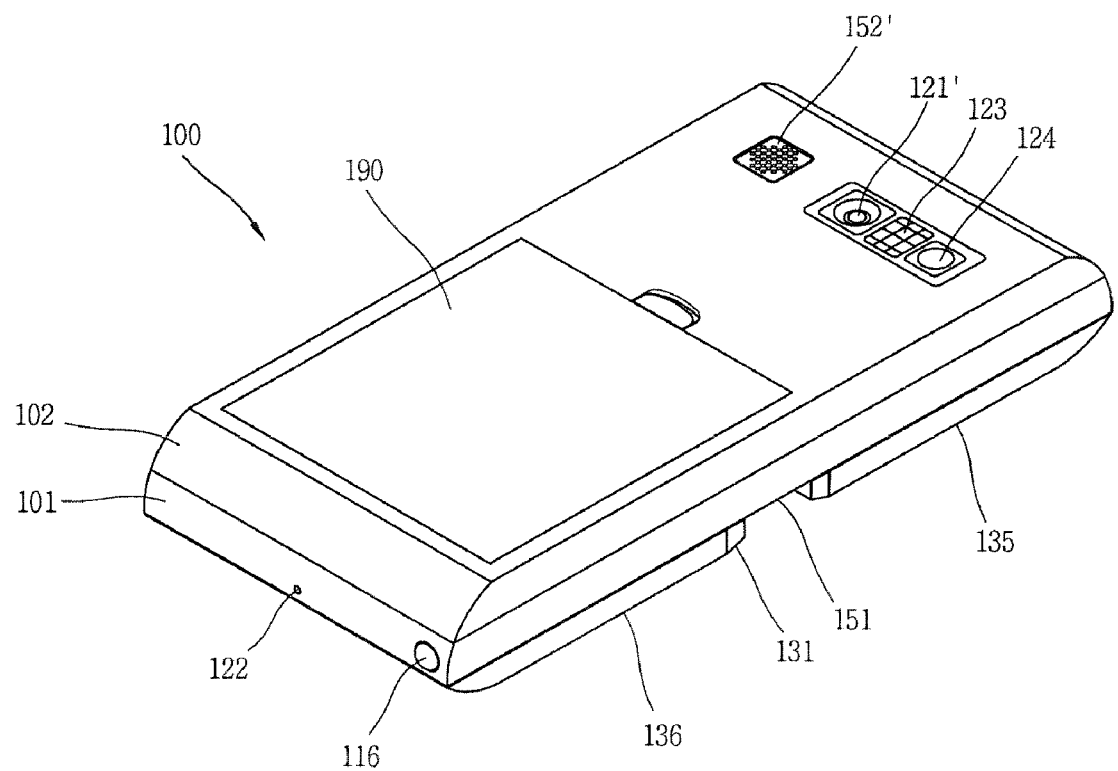
FIG. 5 is a rear perspective view of the terminal of FIG. 2.

FIG. 5 is a rear perspective view of the terminal of FIG. 2. In FIG. 5, camera 121' may additionally or alternatively be disposed on the rear surface of the terminal body, such that this camera is located on rear case 102. Camera 121' may have an image capturing direction which is substantially the opposite to that of camera 121, and may support the same or different resolution, image size, or number of pixels as compared to camera 121.

For instance, camera 121 may operate with a relatively lower resolution to capture images of a user's face and transmit the same to another party during video call or the like, while camera 121' may operate with a relatively higher resolution to capture images of general subjects with high picture quality that is generally not acceptable for real-time transmission. Cameras 121 and 121' may be installed to rotatable, pop-up, fixed, and the like.

Flash 123 and mirror 124 may be additionally located adjacent to camera 121'. When an image of a subject is to be captured with camera 121', the flash 123 illuminates the subject. Mirror 124 allows a user to see themselves when they want to capture their own image (self-image capturing) by using camera 121'.

The rear surface of the terminal body may further include an audio output module 152'. The audio output module may implement a stereo sound function in conjunction with the audio output module 152, and may be also be used for sending and receiving audio calls in a speaker phone mode. Terminal 100 may also include power supply 190, which may be located within the terminal body or detachably mounted to the terminal body.

Figure 6:
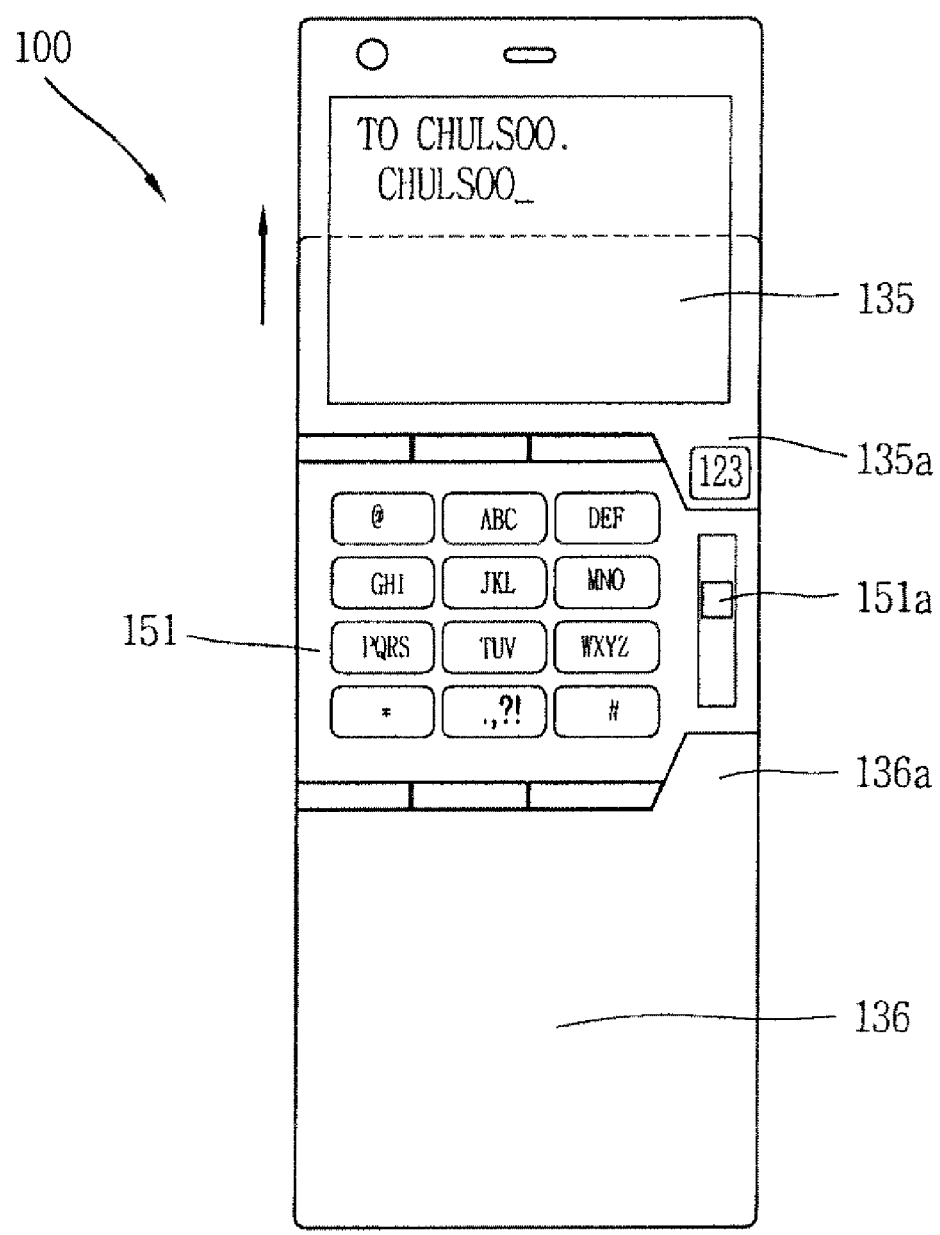
FIG. 6 shows a cover of the terminal moved into the open position.

Referring now to FIG. 6, when cover 135 is moved away from cover 136, soft keys to enable a user to write a text message provide other input may be displayed on the extended exposure area of main display 151. The movement of cover 135 may be sensed by sensing unit 140 (FIG. 1) and input to controller 180. Thus, configuration changes may be under the control controller 180.

In this embodiment, main display 151 is implemented using a touch screen to enable the inputting of information. Scroll bar 151a may be used for scrolling the soft keys and may be located at a suitable region of the main display, such as being located proximate to protrusion portions 135a, 135b as depicted in FIG. 6.

Cover 135 is shown display an output window on which characters inputted by using the soft keys are displayed. A conversion key for converting the soft keys outputted on the main display 151 into another type (e.g., alphabets, numbers, or the like) may be displayed on the protrusion portion 135a of cover 135 to enable the inputting of information by a user's touch. Alternatively, such conversion may be enabled by a push manipulation of user input unit 131 (FIG. 2). By manipulation of the soft keys, the conversion key, and the like, contents displayed on cover 135 may be edited for input or transmission to another party in the case of a messaging application.

Figure 7:
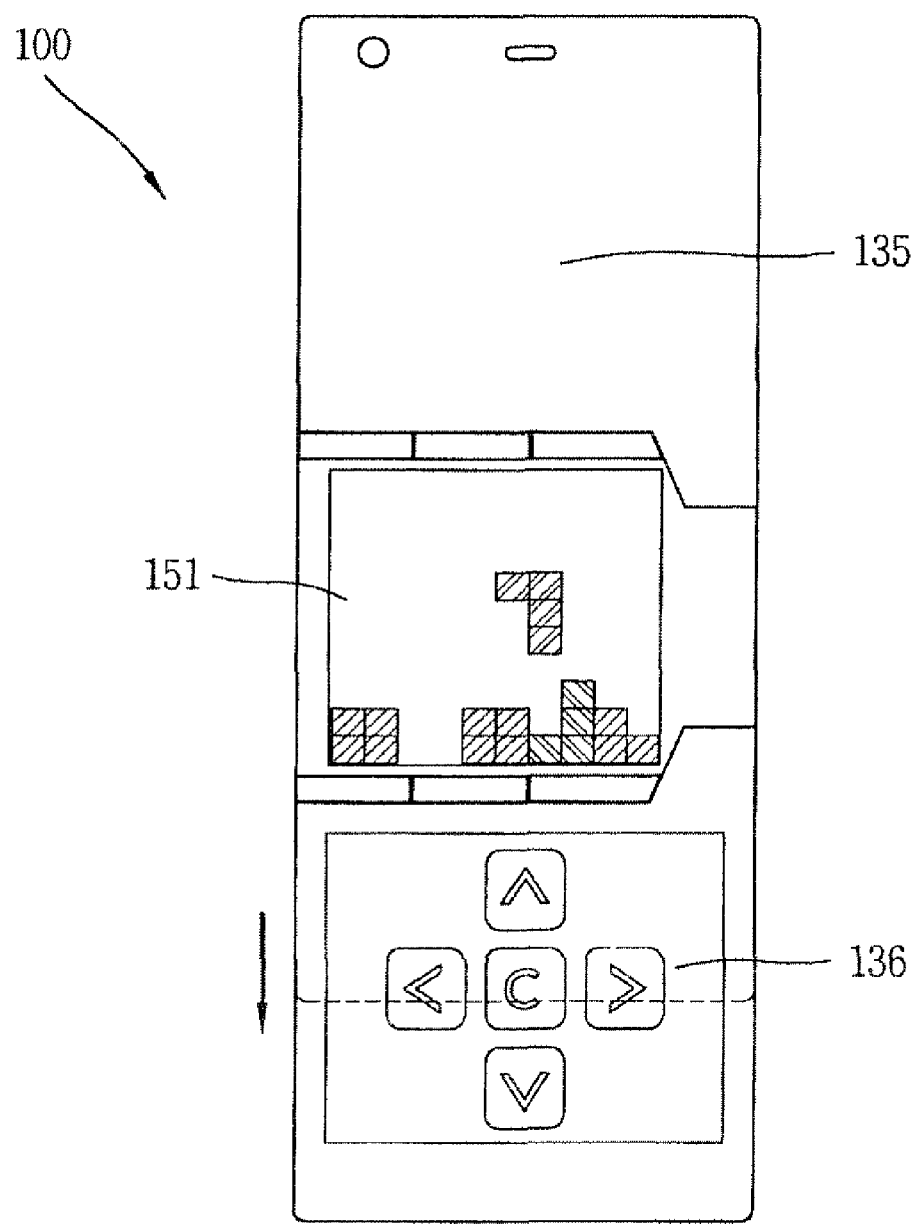
FIG. 7 shows a cover of the terminal moved into the open position.

FIG. 7 shows cover 136 moved into an open position to permit a game application to be displayed on an extended exposure area of main display 151. To adjust or otherwise manipulate objects of the game, cover 136 may be configured to output function keys 701. These function keys are in response to touch input and operate in cooperation with the game or other application being displayed on the main display.

The embodiments of FIGS. 6 and 7 permit terminal 100 to execute a corresponding mode (e.g., messaging or game application) responsive to either of covers 135, 136 being moved into an open position. This feature permits a user to directly access a frequently used mode (which can be user or system adjustable or configurable), without having to perform a menu selection process of multiple steps.

According to a further embodiment, when both the first and second covers 135, 136 are moved to the open position, a third mode (e.g., call mode, email mode, image capture, video capture, and the like) may thus be triggered. As another example, consider further that one cover (e.g., cover 135) is returned to its original closed position after the first and second covers had been positioned in the open position. Upon such event, a further mode (e.g., image capture) may be triggered or otherwise enabled. In the image capture mode example, a preview screen of an object may be displayed on the extended exposure area of main display 151, and keys for controlling the image capturing may be displayed on cover 136.

The foregoing presents at least four operational modes which may be triggered, launched, or otherwise executed responsive to a particular positioning of the first and/or second covers relative to the main display. The specific applications shown are merely exemplary, and it is understood that the described applications may alternatively implement any of the applications described herein, including messaging, games, image capture, video capture, voice call, data transmission, audio reproduction, Internet access, other applications supported by the terminal, and the like.

Figure 8:
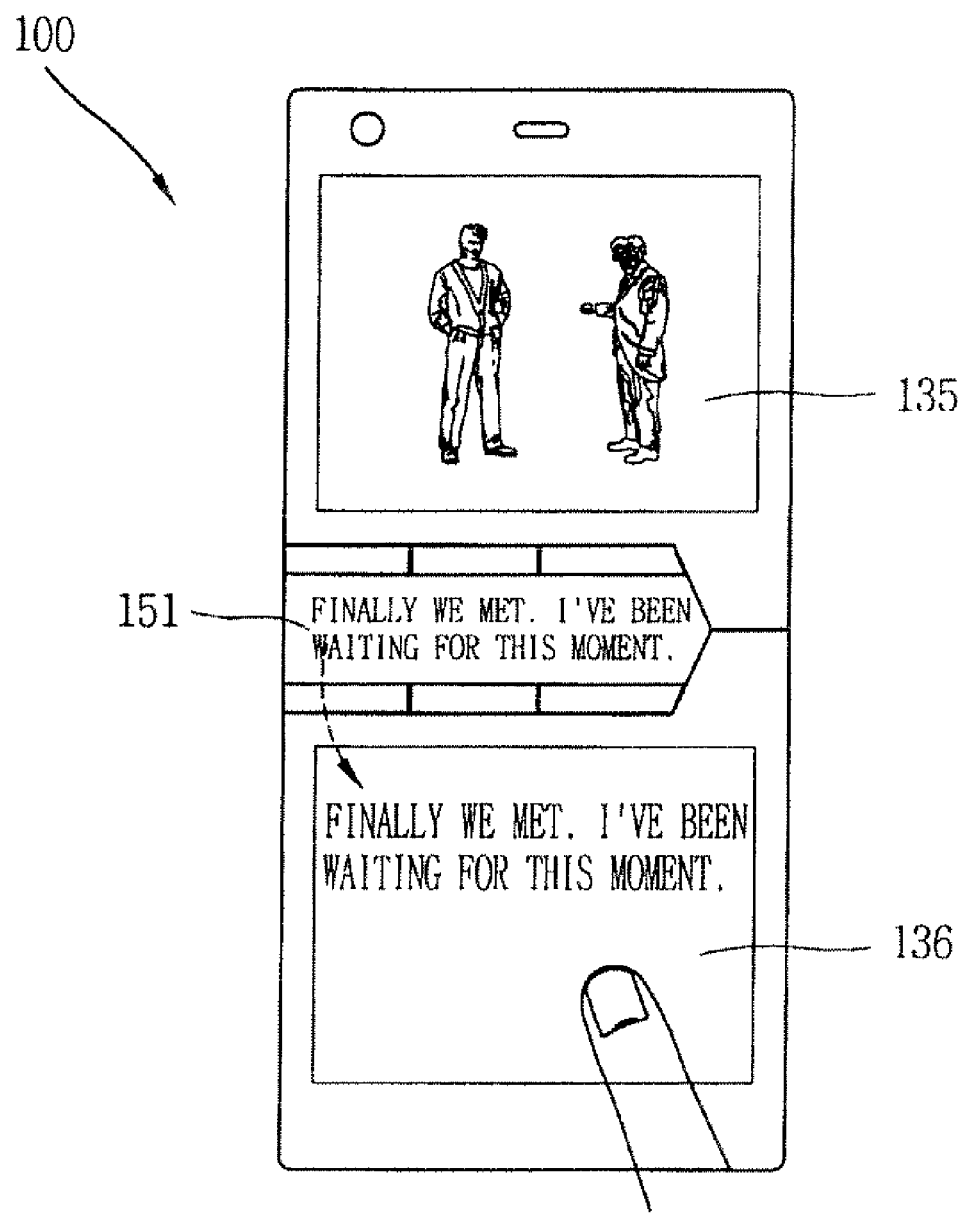
FIGS. 8 and 9 show a control method of the terminal when the cover is moved during playing of a movie.
Figure 9:
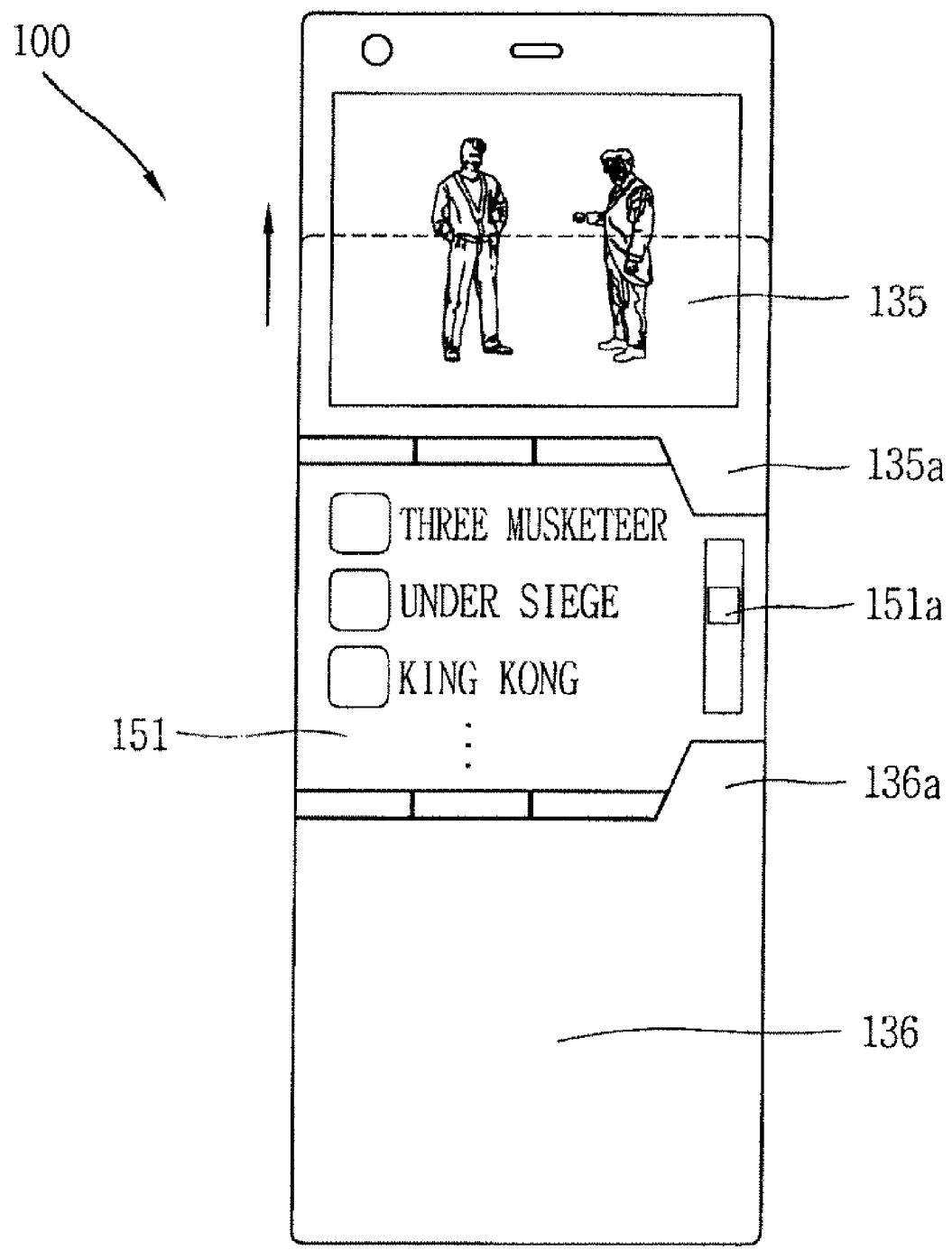

FIGS. 8 and 9 show a terminal after the cover 135 is moved to the open position to permit viewing of a movie. In FIG. 8, first and second covers 135, 136 are in the closed position and video (e.g., first visual information) or other images are output by cover 135, which functions as a display. In this example, second visual information (e.g., title of the video, subtitles, or other information associated with or related to the video) may be output on the exposed area of main display 151.

Alternatively or additionally, if the exposed area is not sufficiently sized to display the second visual information, or if it is otherwise desired, some or all of the second visual information may be displayed by cover 136. This feature may be implemented responsive to user input, such as by the user providing a long-touch, a dragging, a swirl type dragging, or the like, with respect to cover 136 and/or the exposed area of the main display 151.

FIG. 9 shows cover 135 moved into the open position and the displaying of a list (e.g., third visual information) on the exposed area of the main display 151. In this example, the list relates to the video displayed from cover 135, but this is not a requirement. As an alternative, the list may include most any type of information determined by the user or terminal or other application.

The example of FIG. 9 permits the user to touch or otherwise select any of the video title listed on main display 151, thus resulting in this selected video being displayed on cover 135. To facilitate this selection, the user may use scroll bar 151*a* to search or scroll the list to identify additional video titles. Videos are an example of this feature and audio or picture files, for example, may alternatively be selected.

Figure 10:
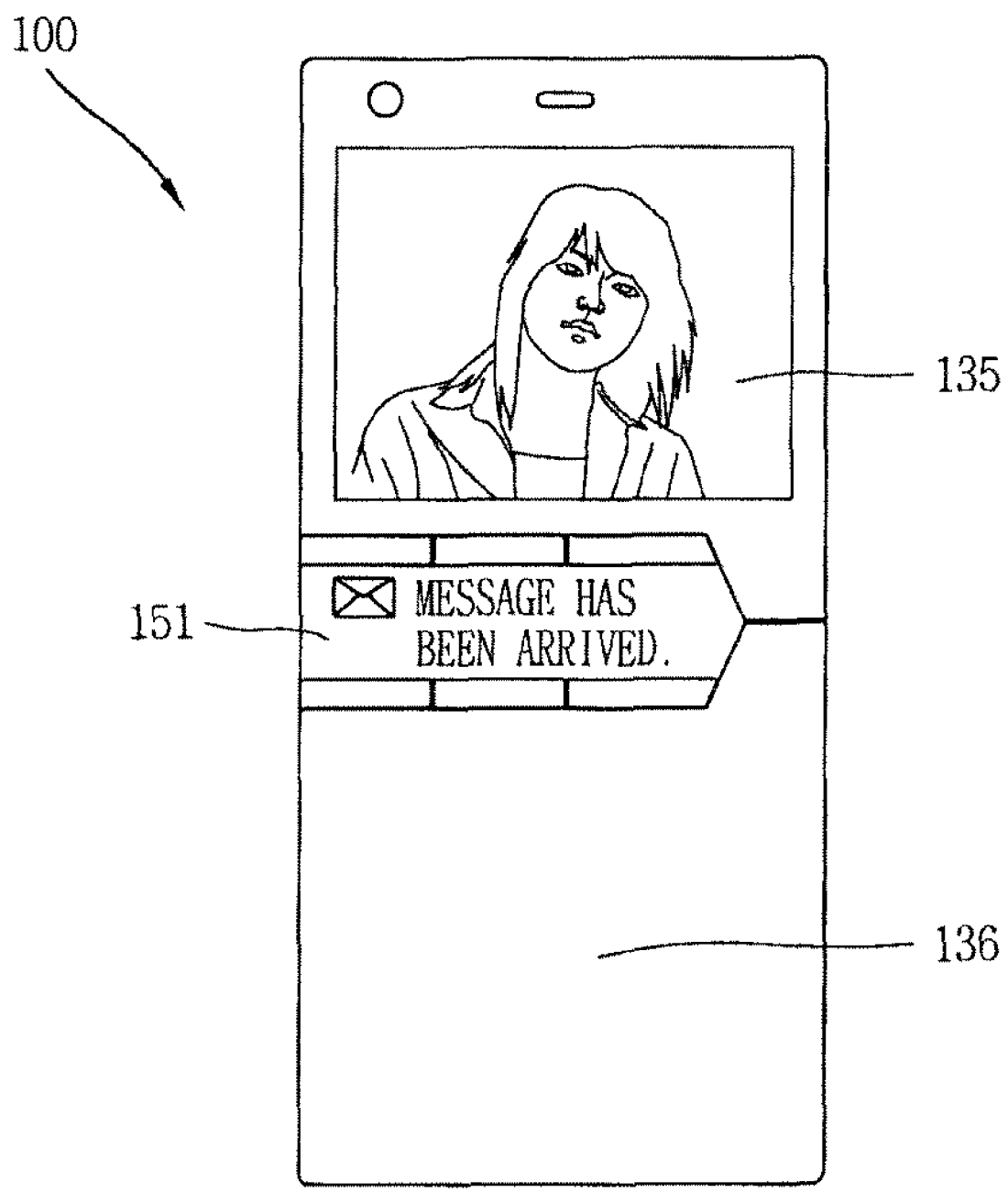
FIGS. 10 and 11 show the terminal displaying an image on a cover.
Figure 11:
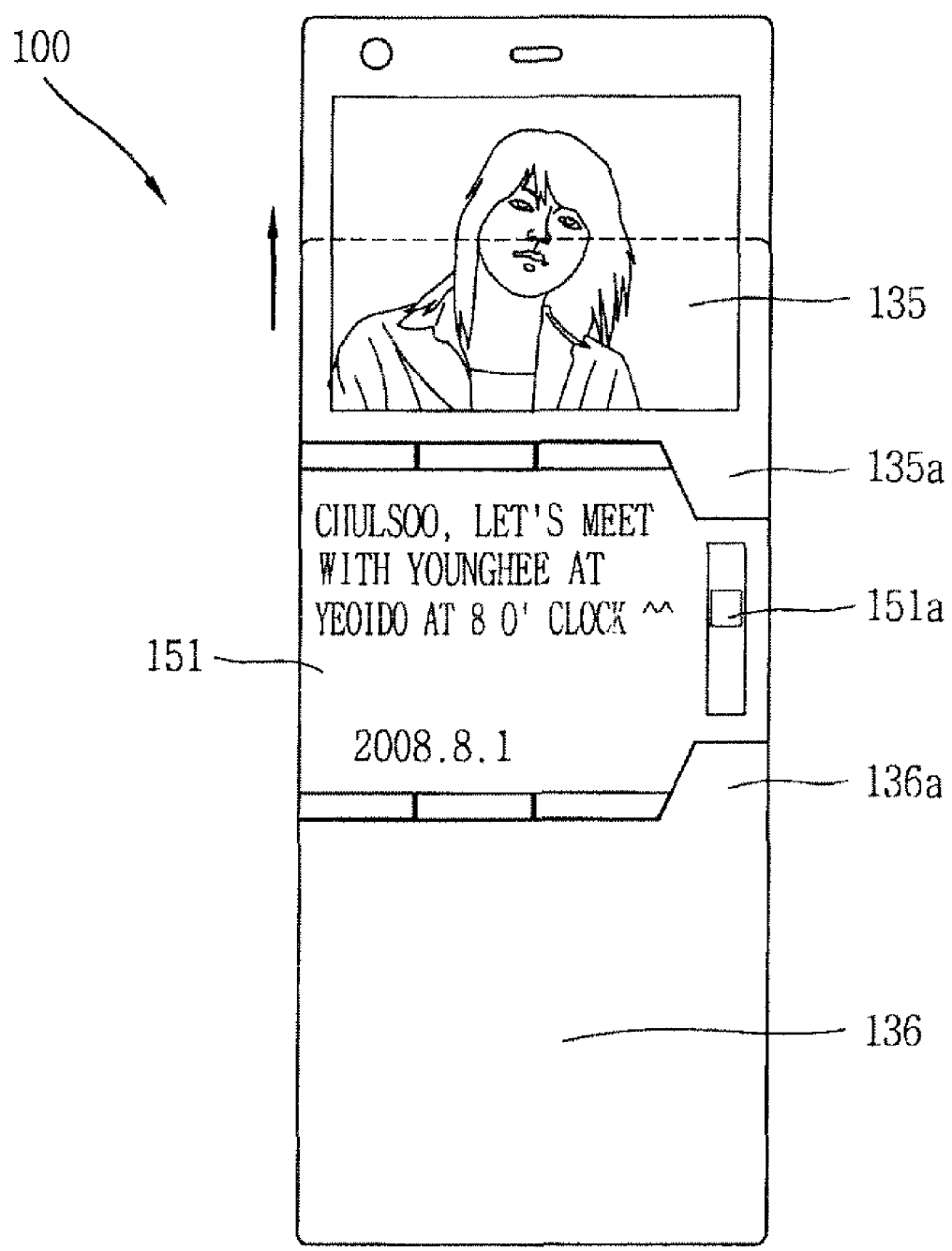

FIGS. 10 and 11 show the terminal displaying an image on a cover. In FIG. 10, the first and second covers 135, 136 are in the closed position and an image (first visual information) is displayed by cover 135. If a message is received, the message, icon, or other related information (second visual information) informing the reception of the message may be displayed on the exposed area of main display 151.

If cover 135 is moved to the open position, the picture remains displayed on cover 135, and contents (third visual information) of the received message is displayed on the extended exposure area of main display 151. Scroll bar 151*a* may be used to facilitate viewing of the message. In this example, the third visual information does not relate to the first visual information, but may be relevant to the second information in that the first visual information is the specific contents represented by the second visual information.

Figure 12:
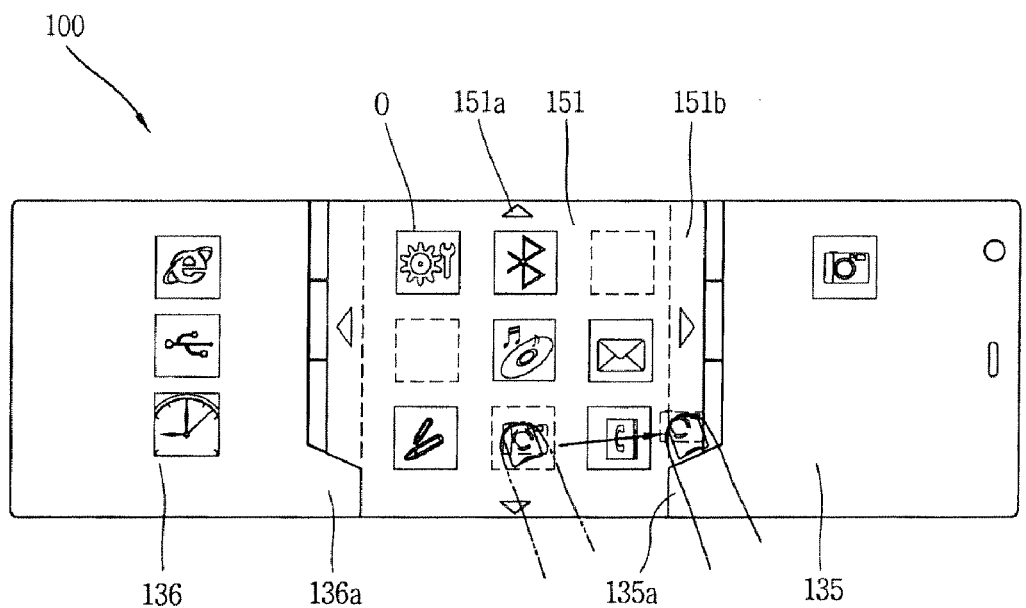
FIG. 12 shows user touch manipulation when the first and second covers of the terminal are in the open position.

FIG. 12 shows user touch manipulation when the first and second covers of the terminal are in the open position. Objects O, e.g., icons, files (file names), or the like, are shown displayed on main display 151. Object O may be moved and outputted onto a display associated with one of the first and second covers 135, 136 responsive to dragging of the object toward the particular cover. Alternatively, drawing a circle or other shape enclosing the object O one or more times, then drawing a similar or other recognizable shape one or more times on either or both of the first and second covers, may cause the selected object O to be moved to the identified portion of the first or second cover.

In general, the objects may be moved from and to any of the first cover, second cover, and main display. Such movement of objects O thus permits objects to be logically stored or located in three areas. For instance, if picture files are displayed on main display 151, the user may move a certain group of these pictures to cover 135. In addition, the user may move another group of these pictures to cover 136, leaving a remaining group of pictures in main display 151.

Menus (e.g., save, delete, or the like) for processing the categorized objects O displayed on the first and second covers 135, 136 and main display 151 may be outputted on certain areas of the covers and main display (e.g., protrusion portions 135*a*, 136*a* or other exposed areas).

Main display 151 may include a movement or relocating area 151*b* such that movement commands for the objects O are clearly recognized. For instance, if an object O that is touched and dragged to the movement area 151*b*, the object O is regarded as an object to be moved to of the corresponding first or second cover. Movement areas 151*b* may be positioned at any of a variety of locations adjacent or proximate to first and second covers 135, 136. An arrow or other indicator for indicating movement direction of an object O may additionally be displayed within each movement area 151*b*.

In some embodiments, while a certain object O is moved from one location to another, another object O displayed at one location may be moved to the other location. This feature permits object exchange between locations.

Figure 13:
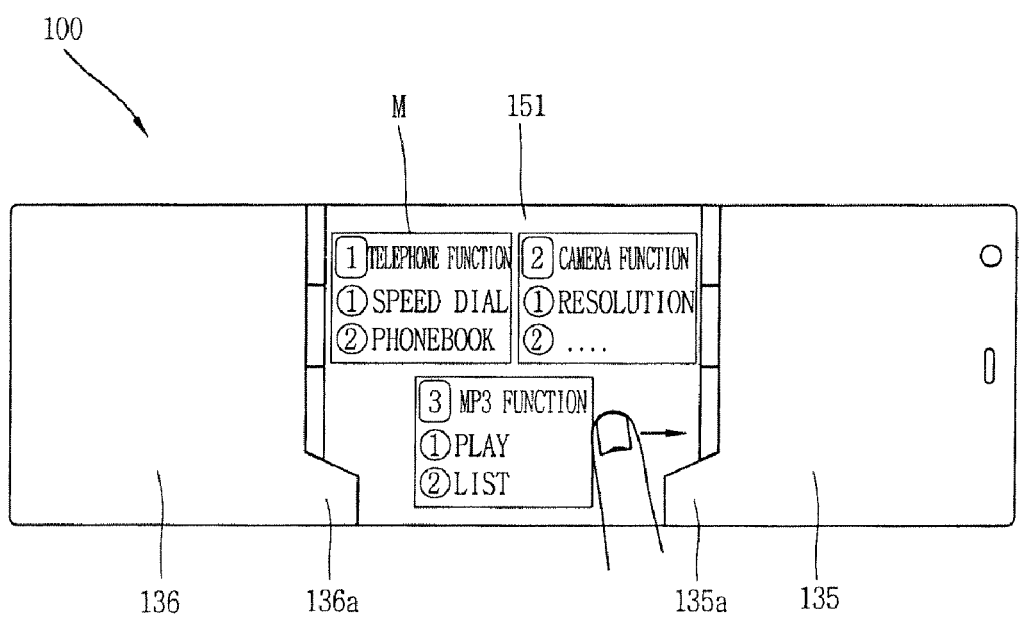
FIGS. 13 and 14 show a technique for moving an output display between the main display and the first and second covers.
Figure 14:
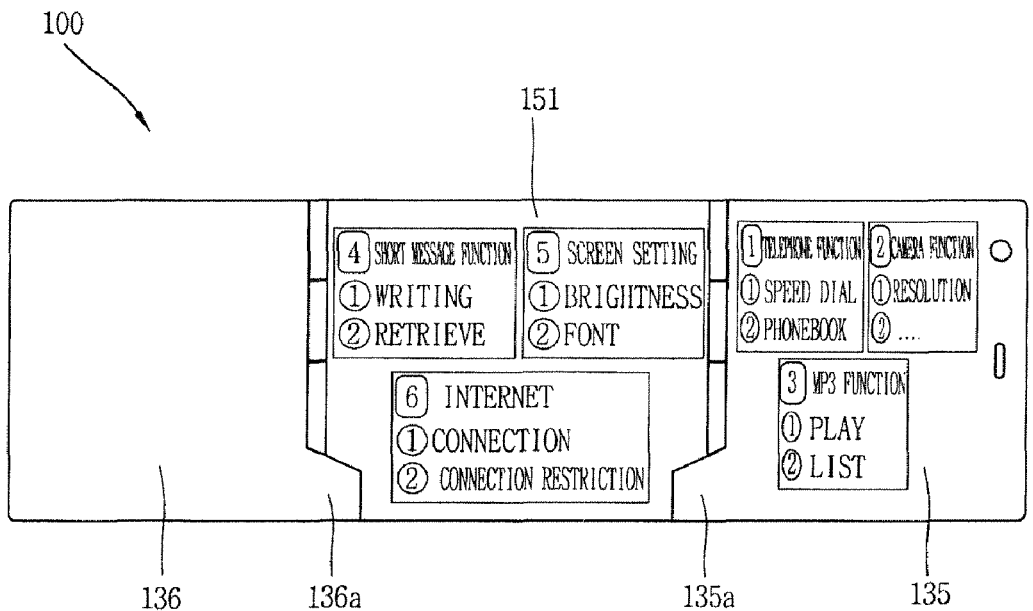

FIGS. 13 and 14 show a technique for moving an output display between the main display and the first and second covers. In FIG. 12, several groups of menus M are output on main display 151. Specific sub menus are also shown included in each of the menu groups.

If the user touches the main display 151, an entire display screen displayed on the main display 151 is moved for output to one of the first and second covers 135, 136. Such touch manipulation may include a touch onto an area where the menu M is not displayed and a dragging thereafter. If the menu M is touched and dragged, a specific menu M only as a selected object may be moved, such as that shown in FIG. 12.

By moving the display screen for displaying the menus M, menus M' are displayed on main display 151. If a display screen for displaying the menus M' is moved to cover 136, other menus may be displayed on the main display 151.

Consequently, submenus belonging to the first menus M can directly be executed on a menu selection screen. If the sub menus are included in the second menu M', the submenus can be executed by one screen movement manipulation. If the mainly used functions (submenus) are included in the first menus M, it enables the user to rapidly access desired specific menus.

Figure 15:
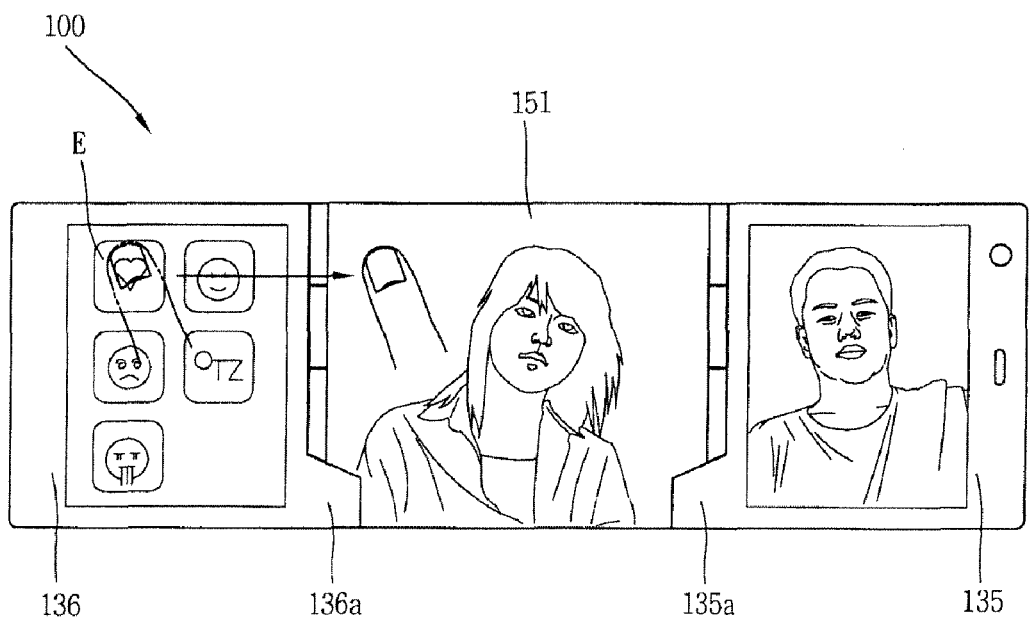
FIGS. 15 and 16 show techniques for moving and transferring a selected object.
Figure 16:
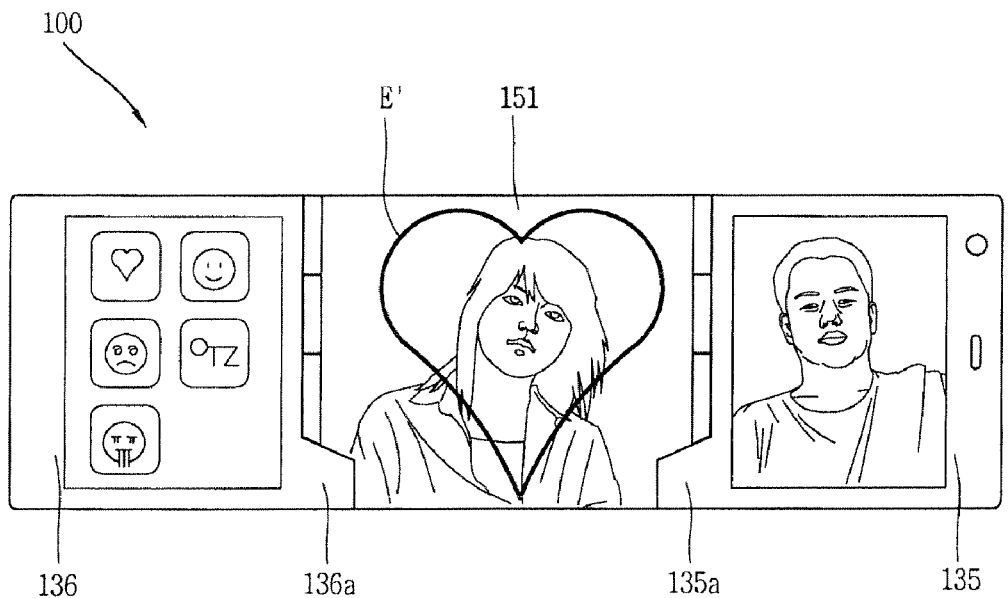

FIGS. 15 and 16 show techniques for moving and transferring a selected object. In FIG. 15, during a video telephony call, a user's image may be outputted on cover 135. The image may be obtained through camera 121 (FIG. 2) or stored in memory 160. An image of the other party may be displayed on main display 151. The image of the other party is transmitted from the portable terminal of the other party.

Cover 136 may output icons (e.g., emoticons) for representing emotions of the user. The emoticons E are stored in memory 160, and include icons capable of representing meanings of love, joy, sorrow, happiness, or the like. The user touches the emoticon E to move it to the main display 151 where the other party's image is outputted.

In FIG. 16, the moved emoticon E is displayed to be overlapped with the other party's image by being extended in proportion to the size of main display 151. If desired, the moved emoticon E may be transmitted to the other party. As a result, the other party, as well as the user, may see the emoticon overlapped with his image, thus sharing emotions without speaking words. Alternatively or additionally, the user may draw an object to express an emotion onto cover 136. A stylus pen may be used to draw a shape, e.g., a heart, a star, or the like.

Figure 17:
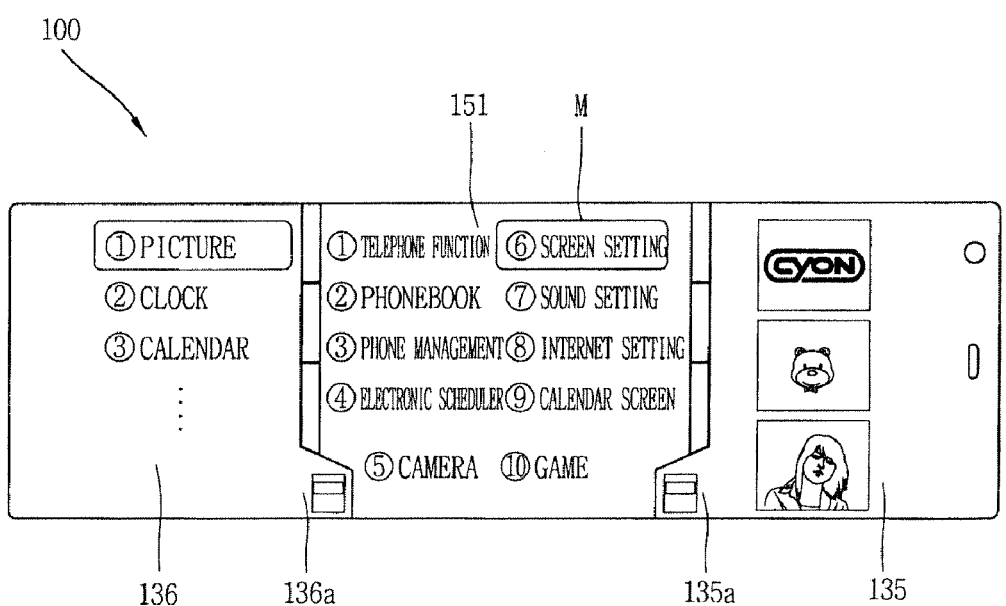
FIG. 17 depicts a technique for displaying information using three screens of the terminal.

FIG. 17 depicts a technique for displaying information using three screens of the terminal. In this figure, the menus M serve as first visual information and may be displayed on main display 151. Specific submenus associated with the menus M need not be displayed on main display 151. Instead, in this example, the submenus are displayed on cover 136.

As an example, if item 6 'screen setting' is selected among the plurality of menus M displayed on main display 151, sub menus (e.g., 'a picture, a clock or the like') associated with the menu item 'screen setting' are displayed as second visual information on cover 136. If a 'picture' is selected among the second visual information, a plurality of pictures for screen display background, which are specific sub menus associated with the selected menu 'picture,' may be outputted as third visual information on cover 135.

After the first visual information displayed on main display 151 is selected, the user may select (e.g., using their left hand), the second visual information outputted on cover 136, while selecting the third visual information outputted on cover 135 by their opposite hand (e.g., right hand). This enables the user to easily recognize the menus having a multiple-step structure, to rapidly select the desired menus, and rapidly search various menus.

Figure 18:
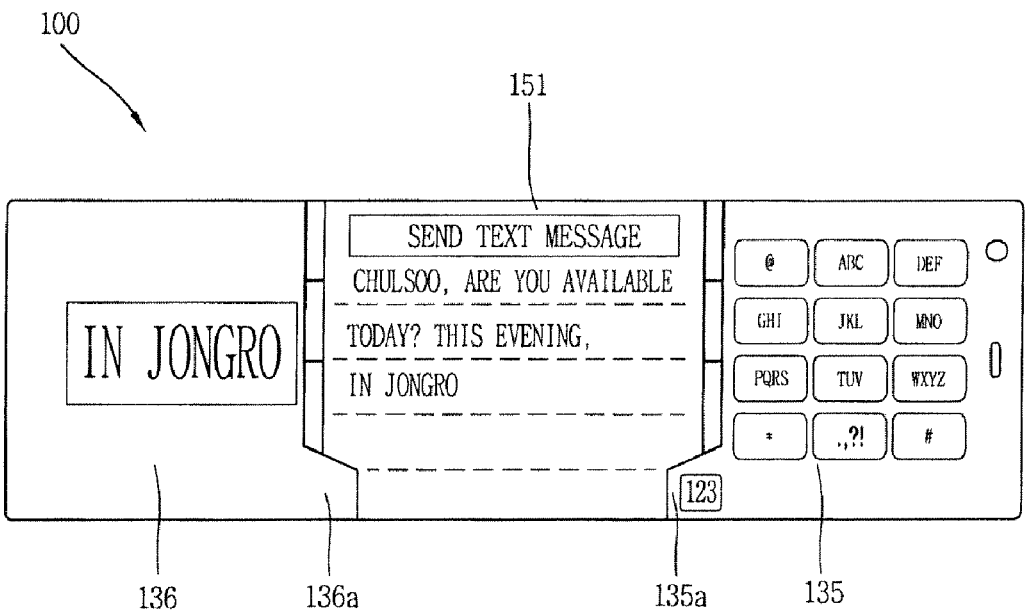
FIGS. 18 and 19 show further techniques for displaying information using three screens.
Figure 19:
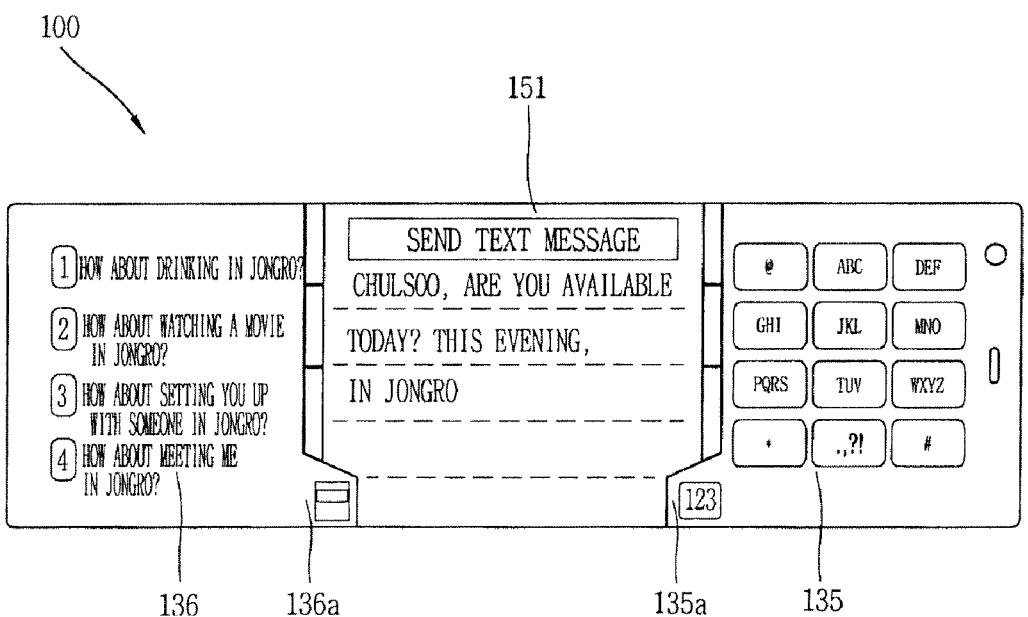

FIGS. 18 and 19 show further techniques for displaying information using three screens. In FIG. 18, a screen for sending a text message is outputted on main display 151. The inputting of content outputted on main display 151 is enabled by the touch of the soft keys displayed on cover 135. A conversion key may be outputted on protrusion portion 135*a* of cover 135 to receive an inputting of a command for replacing the outputted soft keys with other keys (e.g., keys for inputting alphabets, keys for inputting numbers, or the like).

Information associated with a portion of the text message outputted on main display 151 is displayed on cover 136. More specifically, a last inputted phrase, e.g., 'in Jongro,' may be outputted larger than that which is displayed on main display 151. This feature allows the user to easily recognize a currently inputted word or phrase. Therefore, when there is an error, the user may easily recognize such error.

Referring to FIG. 19, when sending a text message as shown in FIG. 18, many sentences, words, or phrases, including a last outputted word or the like on main display 151, may be outputted on cover 136. Such items may be stored in memory 160 in relation to a specific word or phrase, and the terminal may output frequently used sentences on the cover 136 based on a given priority. If one of the stored items is selected, the selected item is added to the content displayed on main display 151. This enables the user to simply and conveniently complete the editing of the text message.

In addition, if the sentence outputted on cover 136 is determined to be undesired or not frequently used, the user may edit the sentence. For instance, the user may delete a specific sentence from memory 160 or may change some of the contents by using the soft keys displayed on cover 135 after performing a long-touch onto the specific sentence. The commands, such as delete, save, or the like, may be enabled by touch manipulation of the menu keys displayed on the protrusion portion 136*a* of the cover 136.

Figure 20:
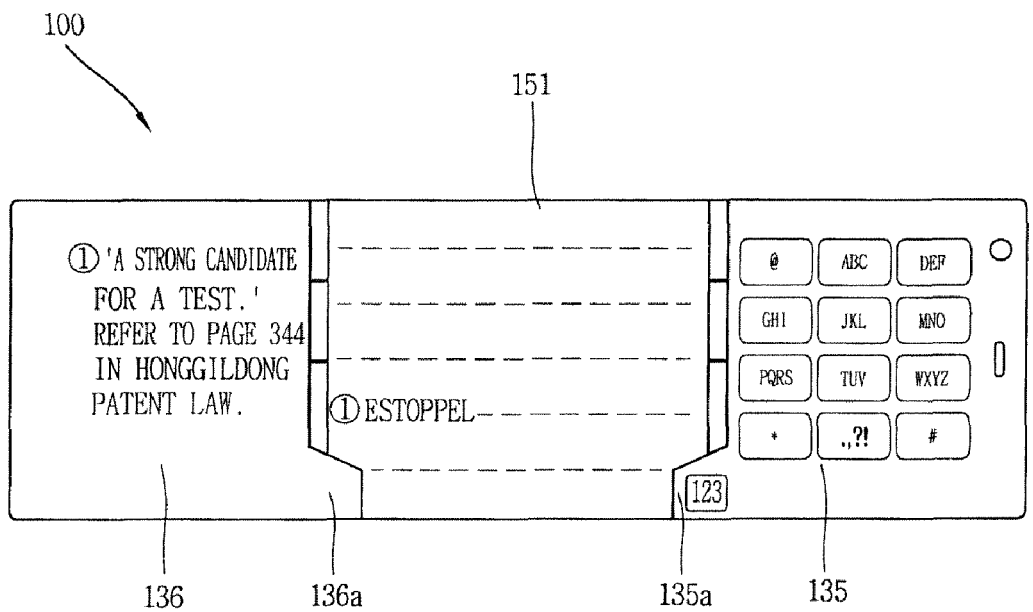
FIG. 20 depicts a terminal which facilitates reading of text in accordance with various embodiments of the present invention

FIG. 20 depicts a terminal which facilitates reading of text in accordance with various embodiments of the present invention. Text stored in memory 160 is outputted on main display 151. Among the outputted text, the user may identify a certain word, a phrase or the like. For instance, if a circle or identifier enclosing or otherwise identifying the word 'estoppel' is drawn on the main display, a dotted line for surrounding the word may be displayed around the word or the word may be displayed in different color relative to other portions of the main display.

In FIG. 30, the identified word is displayed on cover 136, and at another area of cover 136 may have a space for writing a memo or related comment. Soft keys (e.g., numeric or alphanumeric) for editing or inputting the content displayed on cover 136 are shown displayed on cover 135. By using the soft keys, notes (e.g., 'a strong candidate for a test,' 'refer to page 344 in the patent law,' or the like) may be recorded for the designated word 'estoppel.'

The content edited in cover 136, together with the above text, may be stored in memory 160. If the edited text is to be outputted, an identifiable mark may be included on the specific word, thereby allowing the user to check the recorded notes in a certain period of time.

Figure 21:
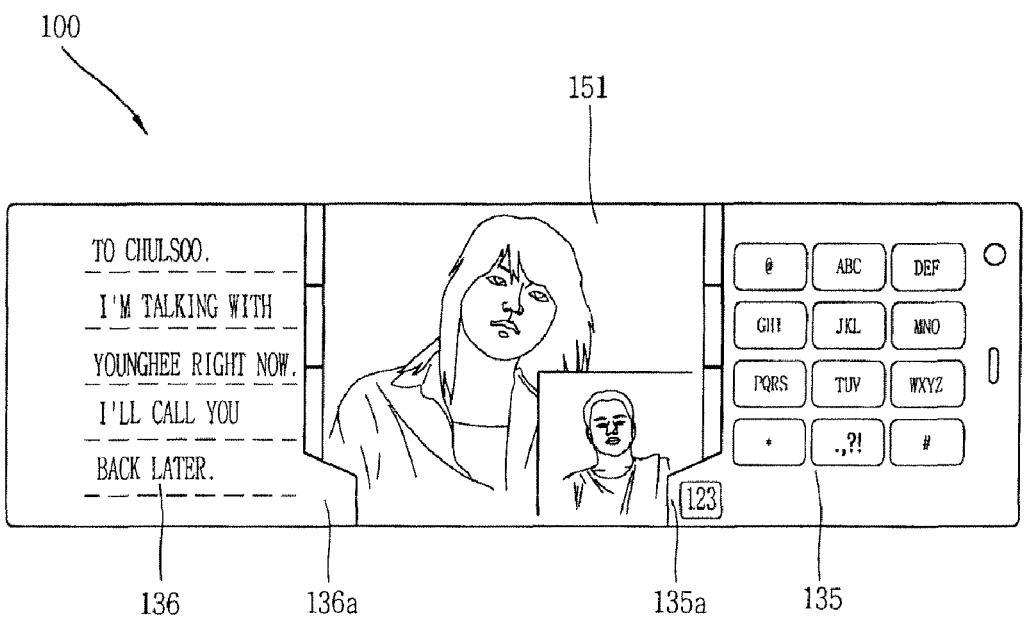
FIG. 21 depicts a terminal which facilitates a video call in accordance with various embodiments of the present invention.

FIG. 21 depicts a terminal which facilitates a video call in accordance with various embodiments of the present invention. During a exemplary video call, main display 151 may be divided into two screens or regions. A larger screen outputs the called party's image, and a smaller screen outputs the user's image. If desired, when a first operation (video call) is occurring on main display 151, a second operation may be performed using the first and/or second covers 135, 136.

An example of a second operation relates to sending a text or other message. For example, if a text message is received from another person during the video call, a reply for the received text message may be transmitted using the first and second covers 135, 136. If cover 136 is configured to output a text message to be edited, cover 135 may configured to output the soft keys for editing such content. The converse is likewise possible. Note that other operations presented herein may be implemented as an alternative to the depicted operations.

Accordingly, the mobile terminal enable concurrent operation of multiple operations (e.g., video call and messaging).

Figure 22:
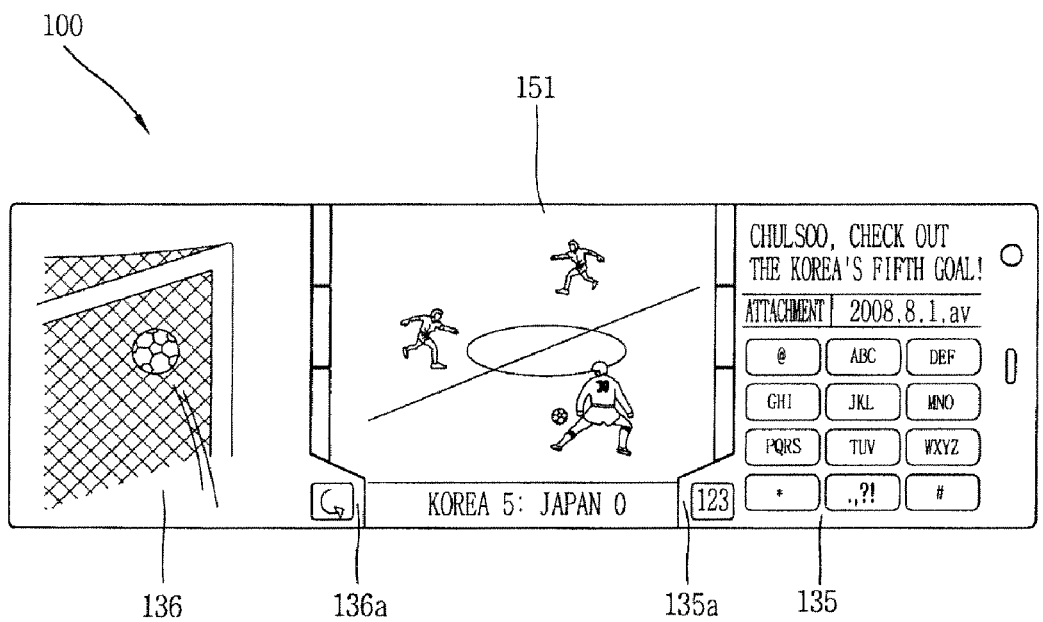
FIG. 22 depicts a terminal which facilitates a recording function and mail transmission in accordance with various embodiments of the present invention.

FIG. 22 depicts a terminal which facilitates a recording function and mail transmission in accordance with various embodiments of the present invention. Main display 151 is shown displaying a broadcasted or video event (e.g., soccer game) and the score of the game in an area proximate to protrusion portions 135*a*, 136*a*. In some embodiments, terminal 100 includes a real time or other type of recording function to support video reproduction. Such video may be stored in memory 150 to permit later play back or transmission, for example.

In the depicted example of displaying the soccer game, if a scene scoring a point is displayed, the user may want to replay the scene scoring the point by using the recording function. The inputting of a command for the replay may be performed by the manipulation of the user input unit 132 (FIG. 2). However, it may alternatively be performed by sliding one of the first and second covers 135, 136 in a defined direction (e.g., toward a closed position) and then returning either or both of the covers to their original position. If cover 135 is moved, the scene scoring the point is outputted on the cover 135. If cover 136 is moved, the scene is outputted on cover 136 is as shown in FIG. 22. A key button for repeated replaying of the scene may be outputted proximate to protrusion portion 136*a*, for example.

When the recording function is implemented responsive to moving either or both first and second covers 135, 136, the user may intuitively manipulate or launch the recording function, without searching for a specific key (e.g., user input unit 132).

When the scene scoring the point is replayed on cover 136, a screen for sending a mail or other message may be outputted on cover 135. In FIG. 22, cover 135 is divided into two screens. An upper portion of cover 135 may display contents to be edited, and a lower portion of this screen may output soft keys for editing the content. The scene scoring the point may therefore be attached as a file to the mail or otherwise associated with the message to be sent. In this example, the user writes a short message of 'check out the scene' using the soft keys, and transmits the same to the other party.

Figure 23:
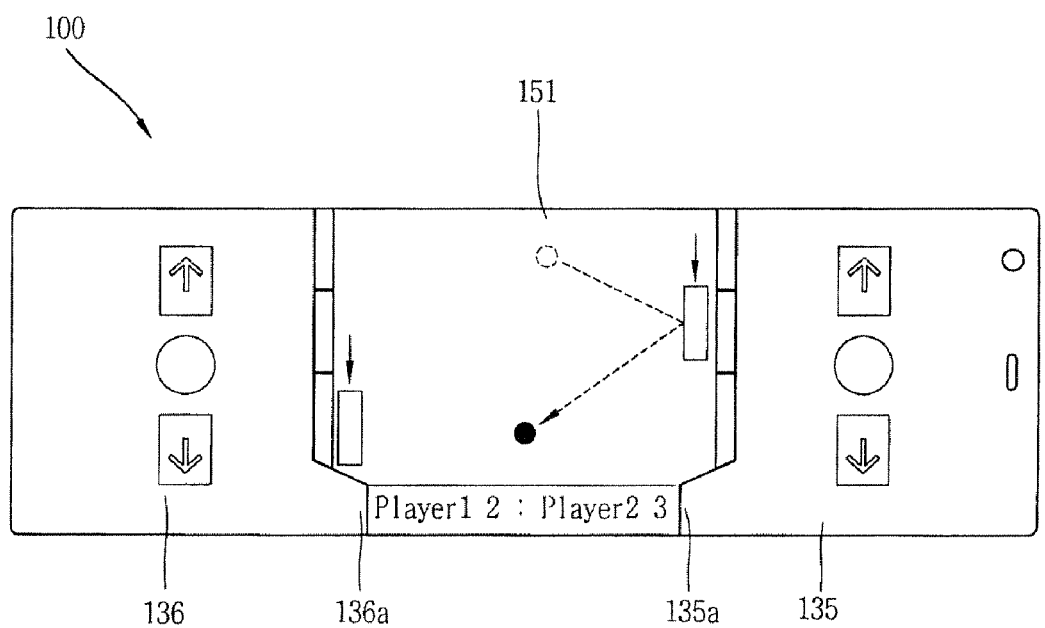
FIG. 23 depicts a terminal which facilitates a game function in accordance with various embodiments of the present invention.

FIG. 23 depicts a terminal which facilitates a game function in accordance with various embodiments of the present invention. Main display 151 displays the game such that a ball is depicted moving within the display. Bars are displayed at edges of the screen, i.e., respective portions adjacent to the first and second covers 135, 136. More specifically, the bars may be located to correspond to the area where the protrusion portions 135*a*, 136*a* are not formed among the facing edges of the first and second covers 135, 136. The ball bumping against the bar is bounced back by a repulsive power. The bars may be configured to be movable along a width direction of the portable terminal 100. A game score may be outputted on an area between protrusion portions 135*a*, 136*a*.

To control movement of the bars, manipulation keys capable of receiving user touch input are displayed on first and second covers 135, 136. In this example, one player manipulates the bar positioned adjacent to the cover 135 through cover 135, while another player manipulates the bar positioned adjacent to cover 136 through cover 136. Accordingly, two-player game play may be implemented using terminal 100.

In addition, a medium for recording a program that provides various embodiments presented herein can be implemented as a code that can be read by a computer or processor. The medium that can be read by a processor includes all types of recording devices for storing data such as a ROM, a RAM, a CD-ROM, a magnetic tape, a floppy disk, and an optical data storing device. The medium can be also implemented as a carrier wave (e.g., a data transmission through the Internet).

The terminal according to various exemplary embodiments of the present invention are configured such that the first and second covers are movable with respect to the main display, thereby controlling the disposition of the first and second covers and the main display according to usage environment and/or a user's need. In accordance with still further embodiments, either or both of the first and second covers may alternatively or additionally be configured at a rear side of the terminal. In other embodiments, either of both of the first and second covers may rotate or otherwise swivel relative to the body main display of the terminal. In addition, if so desired, the first and second covers may be configured to receive touch input, thus implementing a new type of an inputting scheme.

The foregoing embodiments and advantages are merely exemplary and are not to be construed as limiting the present invention. The present teachings can be readily applied to other types of apparatuses and processes. The description of the present invention is intended to be illustrative, and not to limit the scope of the claims. Many alternatives, modifications, and variations will be apparent to those skilled in the art.

What is claimed is:

1. A portable terminal, comprising:
    a body comprising a first display configured to display first data;
    first and second covers coupled to a front side of the body, wherein each of the first and second covers is structured to be physically displaceable relative to the body and each being positionable between open and closed positions, wherein the open position of each of the first and second covers permits a relative increase in viewable portion of the front side of the body, and the closed position of each of the first and second covers permits a relative decrease in viewable portion of the front side of the body; and
    a touch input unit operatively coupled to the first display, wherein the touch input unit is configured to receive input via user contact,
    wherein at least one cover of the first cover or the second cover is configured to display visual information, and
    wherein the touch input unit is operatively coupled to a front side of the at least one cover.

2. The portable terminal of claim 1, wherein the first and second covers are linearly displaceable, in opposing directions, relative to the body.

3. The portable terminal of claim 1, wherein the first and second covers are rotatably displaceable relative to the body.

4. The portable terminal of claim 1, wherein the first cover and/or the second cover is structured to define an opening which exposes at least a portion of the first display when the first and second covers are positioned in the closed position.

5. The portable terminal of claim 4, further comprising:
    a first protrusion formed with the first cover;
    a second protrusion formed with the second cover, wherein an end of the first protrusion at least substantially contacts an end of the second protrusion when the first and second covers are in the closed position.

6. The portable terminal of claim 5, further comprising:
    a key coupled to one of the first and second covers and being positioned at an end portion of a respective one of the first and second covers and proximate to the opening, wherein the key provides an input responsive to user contact.

7. The portable terminal of claim 4, wherein at least one of the first and second covers comprises a touchscreen configured to receive input responsive to user contact with the touchscreen.

8. The portable terminal of claim 1, wherein at least one of the first and second covers comprises material which is sufficiently transparent to permit viewing of the first display.

9. The portable terminal of claim 1, further comprising:
a controller configured to cause output displayed on the first display to vary responsive to which cover of the first and second covers is displaced from either a closed position to an open position, or from an open position to a closed position.

10. The portable terminal of claim 1, wherein both of the first and second covers comprises a touchscreen configured to receive input responsive to user contact with the touchscreen and further being configured to display second display data;
wherein either or both of the first and second covers are structured to define an opening such that when both of the first and second covers are in the closed position the opening permits at least a portion of the first display to be viewable, and
wherein when both of the first and second covers are in the closed position, the first display is configured to display the first data viewable via the opening; and wherein the first and second covers are linearly displaceable relative to the body.

11. The portable terminal of claim 10, wherein when either or both of the first or second covers are in the open position, the first display is configured to display third data which is associated with the second display data.

12. The portable terminal of claim 11, wherein the first display comprises a touchscreen configured to receive input responsive to user contact with the touchscreen of the first display and which controls the displaying of the third data.

13. The portable terminal of claim 1, wherein the first display and the first and second covers each comprise a touchscreen configured to receive input responsive to user contact;
wherein the first and second covers are linearly displaceable relative to the body; and
wherein a displayed object is moved between any of the first display, the first cover, or the second cover responsive to a user-input dragging of the displayed object.

14. The portable terminal of claim 13, further comprising:
a movement area defined as a region of the first display and comprising first and second portions respectively associated with the first and second covers, wherein
the user-input dragging of the displayed object to the first portion of the movement area causes the displayed object to be moved to the touchscreen of the first cover, and
the user-input dragging of the displayed object to the second portion of the movement area causes the displayed object to be moved to the touchscreen of the second cover.

15. The portable terminal of claim 13, wherein the controller is further configured to:
cause output displayed on the touchscreen of a particular one of the first and second covers, wherein the output relates to an application which permits communication with an other party; and
cause data relating to the displayed object to be communicated to the other party responsive at least in part to user-input dragging of the display object to the touchscreen of the particular one of the first and second covers.

16. The portable terminal of claim 1, further comprising a controller configured to:
cause second data to be displayed on one of the first or second covers, the second data being related to the first data displayed on the first display; and
cause third data to be displayed on another one of the first and second covers, the third data being related to the first data or the second data.

17. The portable terminal of claim 16, wherein the third data is displayed as a magnification of a displayed portion of the first data.

18. The portable terminal of claim 17, wherein the third data is editable by a user.

19. The portable terminal of claim 1, further comprising:
a controller configured to provide an first operation via any one of the first display, the first cover, or the second cover, and to provide a second operation via any other one of the first display, the first cover, or the second cover.

20. The portable terminal of claim 1, wherein at least a particular one of the first and second covers comprises a touchscreen configured to receive input responsive to user contact with the touchscreen, the terminal further comprising:
a controller configured to cause video to be displayed on the first display, and to cause the video to be displayed on the touchscreen of the particular cover of the first and second covers responsive to the particular cover being moved into the closed position.

21. The portable terminal of claim 20, wherein the controller is further configured to:
display a messaging application on the touchscreen of another cover of the first and second covers, the messaging application permitting sending to another party a file that is associated with the video being displayed on the touchscreen of the particular cover.

22. The portable terminal of claim 1, wherein at least one of the first and second covers comprises a touchscreen configured to receive input responsive to user contact with the touchscreen, wherein the terminal further comprises:
a soft key configured to be displayed on the touchscreen of an associated cover of the first and second covers, wherein control of the first data of the first display is controllable responsive to user touch input to the soft key.

23. The portable terminal of claim 1, further comprising:
a first protrusion formed with the first cover;
a second protrusion formed with the second cover, wherein an end of the first protrusion at least substantially contacts an end of the second protrusion when the first and second covers are in the closed position; and
a key coupled to one of the first and second protrusions, the key being structured to provide an input responsive to user contact, the input permitting control of a display associated with one of the first and second covers.

24. The portable terminal of claim 1, wherein the first and second covers are physically displaceable in substantially the same plane.

25. The portable terminal of claim 1, wherein the open position of each of the first and second covers permits a relative increase in viewable portion of the first display, and the closed position of each of the first and second covers permits a relative decrease in viewable portion of the first display.

26. A portable terminal, comprising:

a body comprising a first display coupled to the body, the first display being visible from a front side of the body and additionally being configured to display first data;

first and second covers coupled to a rear side of the body, wherein each of the first and second covers is structured to be physically displaceable relative to the body and each being positionable between open and closed positions, wherein the open position of each of the first and second covers permits a relative increase in viewable portion of the rear side of the body, and the closed position of each of the first and second covers permits a relative decrease in viewable portion of the rear side of the body;

a touch input unit operatively coupled to the first display, wherein the touch input unit is configured to receive input via user contact, a second display coupled to the first cover and being visible from a front side of the first cover; and a third display coupled to the second cover and being visible a front side of the second cover, and wherein the open position of each of the first and second covers and associated second and third displays permits a relative increase in viewable portion of the second and third displays, and the closed position of each of the first and second covers permits a relative decrease in viewable portion of the second and third displays.

* * * * *